(12) United States Patent
Katsuragi

(10) Patent No.: US 9,803,093 B2
(45) Date of Patent: Oct. 31, 2017

(54) WHITE INK, INK SET, AND INKJET RECORDING METHOD

(71) Applicant: Koji Katsuragi, Kanagawa (JP)

(72) Inventor: Koji Katsuragi, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 15/356,832

(22) Filed: Nov. 21, 2016

(65) Prior Publication Data

US 2017/0166764 A1    Jun. 15, 2017

(30) Foreign Application Priority Data

Dec. 9, 2015  (JP) .................. 2015-240197
Nov. 9, 2016  (JP) .................. 2016-218933

(51) Int. Cl.

| | | |
|---|---|---|
| G01D 11/00 | (2006.01) | |
| B41J 2/17 | (2006.01) | |
| C09D 1/00 | (2006.01) | |
| C09D 10/00 | (2006.01) | |
| C09D 11/10 | (2014.01) | |
| C09D 11/36 | (2014.01) | |
| C09D 11/40 | (2014.01) | |
| B41J 2/14 | (2006.01) | |

(52) U.S. Cl.
CPC .......... *C09D 11/10* (2013.01); *B41J 2/14016* (2013.01); *C09D 11/36* (2013.01); *C09D 11/40* (2013.01)

(58) Field of Classification Search
CPC ..... C09D 11/326; C09D 11/322; C09D 11/10; C09D 11/36; C09D 11/40
USPC ............... 347/95, 98, 100; 106/31.04, 31.05, 106/31.06, 31.13
See application file for complete search history.

(56) References Cited

U.S. PATENT DOCUMENTS

| | | | |
|---|---|---|---|
| 8,222,319 B2 * | 7/2012 | Sano | B41M 5/0023 523/160 |
| 9,260,619 B2 * | 2/2016 | Okuda | C09D 11/326 |
| 9,593,249 B2 * | 3/2017 | Okada | C09D 11/32 |
| 2016/0152845 A1 | 6/2016 | Okada et al. | |

FOREIGN PATENT DOCUMENTS

| | | |
|---|---|---|
| JP | 2000-239585 | 9/2000 |
| JP | 2009-138077 | 6/2009 |
| JP | 2010-031196 | 2/2010 |
| JP | 2015-174868 A | 10/2015 |

OTHER PUBLICATIONS

Extended European Search Report dated Apr. 7, 2017 in Patent Application No. 16200533.4.

* cited by examiner

*Primary Examiner* — An Do
(74) *Attorney, Agent, or Firm* — Oblon, McClelland, Maier & Neustadt, L.L.P.

(57) ABSTRACT

A white ink includes a hollow resin particle, one or more first organic solvents, an acrylic silicone-based resin, a surfactant; and water. The luminosity (L*) of each of a first dried film having a thickness of 2.2-2.8 μm prepared by drying the white ink at 70 degrees C. and a second dried film having a thickness of 2.2-2.8 μm prepared by drying the white ink at 90 degrees C. is 50 or greater and the decrease ratio of the luminosity (L*) of the second dried film to the first dried film is 10 percent or less.

10 Claims, 1 Drawing Sheet

WHITE INK, INK SET, AND INKJET RECORDING METHOD

CROSS-REFERENCE TO RELATED APPLICATIONS

This patent application is based on and claims priority pursuant to 35 U.S.C. §119 to Japanese Patent Application Nos. 2015-240197, and 2016-218933, filed on Dec. 9, 2015, and Nov. 9, 2016, respectively, in the Japan Patent Office, the entire disclosures of which are hereby incorporated by reference herein.

BACKGROUND

Technical Field

The present invention relates to a white ink, an ink set, and an inkjet recording method.

Description of the Related Art

In general, inkjet methods use titanium dioxide as a material for white ink. In addition, white ink using a hollow resin particle including a hollow inner layer is known as a coloring material.

Such a hollow resin particle demonstrates white utilizing the difference of refractive index between the inner layer and the crust resin of the hollow resin particle.

Particles having an inner diameter of about 0.3 μm and an outer diameter of about 0.5 μm are available on the market as the hollow resin particle. In addition, particles not easily crashed are obtained by providing two layers of crust resins to the hollow resin particle.

When the hollow resin particle is brought into contact with an organic solvent having a solubility parameter (SP) close to the SP value of the crust resin of the hollow resin particle, the crust resin is dissolved therein, which makes the hollow resin particle crashed, so that luminosity (L*) deteriorates.

SUMMARY

According to the present invention, provided is an improved white ink including a hollow resin particle, one or more first organic solvents, an acrylic silicone-based resin, a surfactant; and water. The luminosity (L*) of each of a first dried film having a thickness of 2.2-2.8 μm prepared by drying the white ink at 70 degrees C. and a second dried film having a thickness of 2.2-2.8 μm prepared by drying the white ink at 90 degrees C. is 50 or greater and the decrease ratio of the luminosity (L*) of the second dried film to the first dried film is 10 percent or less.

BRIEF DESCRIPTION OF THE SEVERAL VIEWS OF THE DRAWINGS

Various other objects, features and attendant advantages of the present invention will be more fully appreciated as the same becomes better understood from the detailed description when considered in connection with the accompanying drawings in which like reference characters designate like corresponding parts throughout and wherein.

Figure 1:
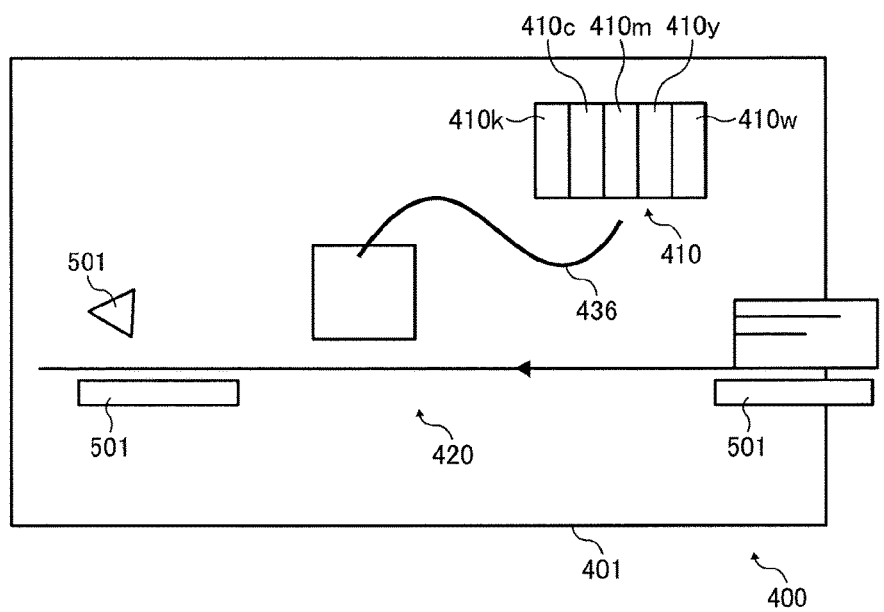
FIG. 1 is a diagram illustrating a side view of an example of a recording device using the white ink of the present disclosure.

The accompanying drawings are intended to depict example embodiments of the present invention and should not be interpreted to limit the scope thereof. The accompanying drawings are not to be considered as drawn to scale unless explicitly noted.

DESCRIPTION OF THE EMBODIMENTS

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

As used herein, the singular forms "a", "an", and "the" are intended to include the plural forms as well, unless the context clearly indicates otherwise.

Moreover, image forming, recording, printing, modeling, etc. in the present disclosure represent the same meaning.

White Ink

The white ink of the present disclosure includes a hollow resin particle, one or more first organic solvents, an acrylic silicone-based resin, a surfactant, and water. Luminosity (L*) of each of a first dried film having a thickness of 2.2-2.8 μm prepared by drying the white ink at 70 degrees C. and a second dried film having a thickness of 2.2-2.8 μm prepared by drying the white ink at 90 degrees C. is 50 or greater and the decrease ratio of the luminosity (L*) of the second dried film to the first dried film is 10 percent or less.

To obtain a white ink having a luminosity of 50 or greater when dried, titanium oxide, which is a typical white pigment, is not suitable. Instead, a hollow resin particle has to be used.

When the white ink includes a hollow resin particle, the inside of the hollow resin particle is filled with a solvent. For this reason, the white ink is not white before it is dried since the solvent inside is not completely evaporated.

Therefore, luminosity of the white ink including a hollow resin particle has to be compared when the white ink is dried.

The hollow resin particle in the white ink is not crashed when the drying temperature is 70 degrees C. or lower so that luminosity does not significantly drop. This is because non-dried solvent is present around the hollow resin particle when the drying temperature is low. Due to the existence of the non-dried solvent, crashing of the hollow resin particle is thought to be reduced. When other color ink is printed after the white ink, contact between the white ink and the color ink is relieved, crashing of the hollow resin particle is considered to be reduced.

However, if the drying temperature is 90 degrees C., due to heat resistance property of the hollow resin particle, crashing occurs and luminosity deteriorates in the case of typical white ink. When other color ink is printed, the solvent in the other color ink dissolves the crust resin of the hollow resin particle, which causing crashing of the hollow resin particle, so that luminosity deteriorate.

According to the present disclosure, the decrease ratio of the luminosity of a white ink including a hollow resin particle is 10 percent at most because of the combination of an organic solvent, acrylic silicone-based resin, etc. even when the white ink is dried at 90 degrees C.

The decrease ratio of the luminosity (L*) is obtained as follows:

(luminosity of a first dried film having a thickness of 2.2-2.8 μm prepared by drying white ink at 70 degrees C.−luminosity of a second dried film having a thickness of 2.2-2.8 μm prepared by drying white ink at 90 degrees C.)/(luminosity of a first dried film having a thickness of 2.2-2.8 µm prepared by drying white ink at 70 degrees C.)

Luminosity is measured by a pectrophotometric densitometer (939, manufactured by X-Rite).

In addition, in the present disclosure, the drying time at the drying temperature of 70 degrees C. and the drying temperature of 90 degrees C. is 60 seconds.

In the present disclosure, the drying temperature 90 degrees C. and the drying time of 60 seconds are assumed to be upper limit of the drying temperature and the drying time. If the decrease ratio of the luminosity is 10 percent or less, it means that the luminosity of a white ink does not decrease during heating and drying.

The present disclosure regulates the luminosity of a dried film having a thickness of 2.2-2.8 µm at the time of drying.

In addition, since the hollow resin particle has a large particle diameter, the difference of 0.6 µm can be ignored.

The organic solvent (first organic solvent), the water, the hollow resin particle, the acrylic silicone-based resin, the surfactant, and other additives for use in the white ink are described below. Examples of the other additives include, defoaming agents, preservatives and fungicides, corrosion inhibitors, and pH regulators.

Moreover, the white ink preferably includes wax.

Organic Solvent (First Organic Solvent)

The first organic solvent for use in the present disclosure preferably has a mixing solubility parameter (SP) of the first organic solvent and the water in the white ink of 17.0-20.3 $(cal/cm^3)^{0.5}$. When the SP value is set to 17.0 $(cal/cm^3)^{0.5}$ or greater, crashing of the hollow resin particle can be reduced. When the SP value is set to 20.3 $(cal/cm^3)^{0.5}$ or less, drying property is improved, leading to improvement of fixability.

It is preferable to set the SP value in the range specified above to reduce the crashing of the hollow resin particle.

In addition, when each hydrogen bond term of all of one or more first organic solvents contained in the white ink is 3-6.8 $(cal/cm^3)^{0.5}$ and each boiling point of all of one or more first organic solvents is 150-300 degrees C., fixability is improved, which is preferable.

The hydrogen bond term can be obtained according to the atomic group aggregation method of treating organic molecules as atomic groups, which is proposed by Krevelen (refer to Krevelen, *Properties of Polymer*, Second edition, New York, 154 (1976).

Examples of the organic solvents satisfying the conditions mentioned above are glycerin, 1,2-propanediol, 1,3-propanediol, 1,2-butanediol, 1,3-butanediol, isoprene glycol, and oxetane compounds. These solvents improve fixability, which is preferable. Specific examples of the oxetane compounds include, but are not limited to, 3-ethyl-3-hydroxymethyl oxetane and 3-ethyl-3-oxetane methanol.

The mixing SP value in the solution of the organic solvent and water contained in a white ink is calculated according to the following relation. The total of the volume of the organic solvent and water in a white ink is set as 1 and the volume ratio and the SP value of each solvent and the volume ratio and the SP value of water are calculated.

SP value$(cal/cm^3)^{0.5}$ in solution of organic solvent and water in white ink=[SP value of organic solvent $A$×volume ratio of organic solvent $A$]+ [SP value of organic solvent $B$×volume ratio of organic solvent $B$]+ . . . +[SP value of water× volume ratio of water]

Mixing SP value of a solution of an organic solvent and water is obtained by, for example, separating a solid portion such as resin and pigment in white ink using a centrifugal, analyzing compositions of the organic solvent using a gas chromatography mass spectrometer (GC-MS), and checking the identity and content thereof. Density of raw materials and volume ratio of addition density are calculated from the content (mass base) obtained by GC-MS.

The SP value of organic solvent can be obtained by turbidimetric titration (K. W. Suh J. M. Corbett, J. Apply polym. Sci., 12[10], p 2,359-2,370 (1968)).

In addition, the organic solvent in the present disclosure includes articles classified as permeating agent or defoaming agent in terms of functionality. In addition, the SP value is calculated only for an article accounting for 3 percent by mass or more of the entire of white ink.

Polyol compounds having eight or more carbon atoms and glycol ether compounds are also suitable. Specific examples of the polyol compounds having eight or more carbon atoms include, but are not limited to, 2-ethyl-1,3-hexanediol and 2,2,4-trimethyl-1,3-pentanediol.

Specific examples of the glycolether compounds include, but are not limited to, polyol alkylethers such as ethyleneglycol monoethylether, ethyleneglycol monobutylether, diethyleneglycol monomethylether, diethyleneglycol monoethylether, diethyleneglycol monobutylether, tetraethyleneglycol monomethylether, and propyleneglycol monoethylether; and polyol arylethers such as ethyleneglycol monophenylether and ethyleneglycol monobenzylether.

The polyol compounds having eight or more carbon atoms and glycolether compounds enhance permeability of ink when paper is used as a print medium (recording medium).

The proportion of the organic solvent in ink is not particularly limited and can be suitably selected to suit to a particular application. For example, in terms of the drying property and discharging reliability of the ink, the proportion is preferably 10-60 percent by mass and more preferably 20-60 percent by mass.

Water

The proportion of water in the ink is not particularly limited and can be suitably selected to suit to a particular application. For example, in terms of the drying property and discharging reliability of the ink, the proportion is preferably 10-90 percent by mass and more preferably 20-60 percent by mass.

Hollow Resin Particle

The hollow resin particle for use in the present disclosure has a hollow inner layer and an outer layer covered with a resin. The hollow resin particle preferably has an outer diameter of about 0.1-about 1 µm and, the inner diameter, about 0.05-about 0.8 µm. Since the inner layer is hollow, specific gravity as white ink is about 1 so that, unlike titanium dioxide, the white ink does not precipitate over time. Taking into account no precipitation over time, it is preferable that the thickness of the crust resin of the hollow resin particle be 10-20 percent to the diameter of the entire hollow resin particle.

In addition, when the mixing SP value of a solution of the organic solvent and water in a white ink is close to the SP value of the crust resin of the hollow resin particle, the crust resin of the hollow resin particle is easily dissolved by the organic solvent and water contained in the white ink. Therefore, it is preferable to use a resin for the crust resin which has a difference between the SP value and the mixing SP value of a solution mixture of the organic solvent and water in a white ink. The difference is preferably 1-10. In addition, when the white ink of the present disclosure is used together with ink (black ink and chromatic color ink), similarly the mixing SP value of a solution of the organic solvent and water in a white ink and the SP value of the crust resin of the hollow resin particle preferably has a difference.

It is preferable to use a styrene-acrylic resin as the hollow resin particle in terms of the air layer of the inner layer and refractive index. In addition, taking into account drying ascribable to heat, it is suitable to change to a thermoplastic resin.

Specific examples of products available on the market of the hollow resin particle for use in the present disclosure include, but are not limited to, ROPAQUE ULTRA E DUAL OP-62, manufactured by Rohm and Haas and Cybinol series (manufactured by Saiden Chemical Industry Co., Ltd.), and SX series (manufactured by JSR Corporation).

The proportion of the hollow resin particle in the white ink is preferably 5-12.5 percent by mass and more preferably 8.5-10 percent by mass in terms of enhancement of luminosity.

Preparation methods of the hollow resin particles are not particularly limited and known methods can be applied to the preparation. As the preparation method of the hollow resin particle, it is possible to employ the so-called emulsion polymerization method in which, for example, vinyl monomers, surfactants, polymerization initiators, and aqueous dispersion medium are stirred while being heated in nitrogen atmosphere to form a hollow resin particle emulsion.

An example of the vinyl monomer is non-ionic monoethylene unsaturated monomer. Specific examples include, but are not limited to, styrene, vinyl toluene, ethylene, vinylacetate, vinyl chloride, vinylidene chloride, acrylonitrile, (meth)acrylamide, and (meth)acrylate. Specific examples of the (meth)acrylate include, but are not limited to, methylacrylate, methylmethacrylate, ethyl(meth)acrylate, butyl (meth)acrylate, 2-hydroxyethylmethacrylate, 2-ethylhexyl (meth)acrylate, benzyl(meth)acrylate, lauryl(meth)acrylate, oleyl(meth)acrylate, palmityl(meth)acrylate, and stearyl (meth)acrylate.

In addition, it is possible to use a di-functional vinyl monomer as the vinyl monomer.

As the di-functional monomer, specific examples include, but are not limited to, divinylbenzene, aryl methacrylate, ethyleneglycol dimethacrylate, 1,3-butane diol dimethacrylate, diethyleneglyco dimethacrylate, trimethylol propane trimethacrylate.

The mono-functional vinyl monomer mentioned above and the di-functional vinyl monomer mentioned above are copolymerized for high level cross linking, so that a hollow resin particle having good light scattering property, heat resistance, chemical resistance, and solvent dispersibility is obtained.

As the surfactant, articles forming molecule aggregation such as micelle in water are suitable. Examples are anionic surfactants, non-ionic surfactants, cationic surfactants, and amphoteric surfactants.

As the polymerization initiator, known water-soluble compounds are usable. Examples are hydrogen peroxide and potassium persulfate.

Examples of aqueous solvent medium are water and water containing a hydrophilic organic solvent.

Resin

In the present disclosure, acrylic silicone-based resins are contained. Other resins may be used in combination with the acrylic-silicone resin. The other resins are not particularly limited and can be suitably selected to suit to a particular application. Examples are urethane resins, polyester resins, acrylic resins, vinyl acetate-based resins, styrene-based resins, butadiene-based resins, styrene-butadiene-based resins, vinyl chloride-based resins, and acrylic styrene resins.

The acrylic silicone-based resin and the resin used can be particulate. It is possible to mix a resin emulsion in which the resin particle is dispersed in water serving as a dispersion medium with materials such as a coloring material and an organic solvent to obtain a white ink. It is possible to use suitably synthesized particles or products available on the market as the resin particle.

The acrylic silicone-based resin for use in the present disclosure is obtained by reacting acrylic acid- or acrylate-based polymer and organopolysiloxane. Normally, block polymers or graft polymers having a molecular mass of 10,000-150,000 and preferably 10,000-50,000 are suitable.

This organopolysiloxane is preferably a linear polymer having a hydroxyl group. An example is as follows.

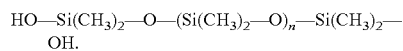

In the formula, n represents 1,000-5,000.

Methyl group in the formula may be substituted with ethyl group, vinyl group, or phenyl group up to 80 mol percent. However, organosiloxane including methyl group in an amount of 50 mol percent or more and preferably 60 mol percent or more is preferable.

Acrylic acid- or acrylate-based polymers or copolymers are obtained by polymerization reaction of monomers such as $\alpha,\beta$-unsaturated acids or esters thereof. The molecular mass is 500-80,000 and preferably 1,000-15,000. Examples of $\alpha,\beta$-unsaturated acids or esters thereof are acrylic acid, methacrylic acid, methyl esters, ethyl esters, butyl esters, stearyl esters, 2-ethylhexyl esters, 2-hydroxyethyl ester, and 3-hydroxypropyl esters thereof. In addition, specific examples of comonomers polymerized with the $\alpha,\beta$-unsaturated acids or esters thereof include, but are not limited to, maleic acid, itaconic acid, fumaric acid, styrene, $\alpha$-methylstyrene, vinylacetate, and vinyl propoionate. When the acrylic acid- or acrylate-based polymer is a copolymer, the proportion of acrylic acid, methacrylic acid, and esters thereof is 10-75 mol percent and preferably 25-60 mol percent.

The glass transition temperature of the acrylic silicone-based resin for use in the present disclosure is preferably 30 degrees C. or lower and more preferably 0 degrees C. or lower. When the glass transition temperature is low, a resin dried by heating is melted forming a glass state. The melted resin covers the circumference of a hollow resin particle, which makes it possible to avoid crashing of the hollow resin particle in particular in the case of color mixing with chromatic ink.

The glass transition temperature can be measured by differential scanning calorimetry (DSC-60 Plus, manufactured by Shimadzu Corporation). DSC measures the temperatures of a reference material and a sample while providing a constant amount of heat and is capable of measuring endothermic reaction and exothermic reaction due to state change of the sample, taking the thermal property of the sample as the temperature difference. In the present disclosure, the temperature range is set to −50 to 10 degrees C. and the temperature rising rate is set to 10 degrees C./min for measuring.

The 90 percent cumulative volume distribution of resin particle is not particularly limited and can be suitably selected to suit to a particular application. The 90 percent cumulative volume distribution is preferably 10-1,000 nm, more preferably 10-200 nm, and particularly preferably 10-100 nm to obtain good fixability and image hardness.

The 90 percent cumulative volume distribution can be measured by using, for example, a particle size analyzer (Nanotrac Wave-UT151, manufactured by MicrotracBEL Corp.).

The proportion of the resin is not particularly limited and can be suitably selected to suit to a particular application. In terms of fixability and storage stability of ink, it is preferably 1-30 percent by mass and more preferably 5-20 percent by mass to the total content of the ink.

The proportion of the acrylic silicone-based resin to the hollow resin particle is not particularly limited and can be suitably selected to suit to a particular application. The mass ratio of the acrylic silicone-based resin to the hollow resin particle is 0.25-1 and more preferably 0.5-1.

The particle diameter of the solid portion in white ink is not particularly limited and can be suitably selected to suit to a particular application. For example, the maximum frequency in the maximum number conversion is preferably 20-1,000 nm and more preferably 20-800 nm to ameliorate the discharging stability and image quality such as image density. The solid portion includes resin particles, particles of pigments, etc. The particle diameter can be measured by using a particle size analyzer (Nanotrac Wave-UT151, manufactured by MicrotracBEL Corp).

Surfactant

Examples of the surfactant are silicone-based surfactants, fluorochemical surfactants, amphoteric surfactants, nonionic surfactants, anionic surfactants, etc. Of these, silicone-based surfactants and fluorochemical surfactants are particularly preferable.

The silicone-based surfactant has no specific limit and can be suitably selected to suit to a particular application.

Of these, preferred are silicone-based surfactants which are not decomposed even in a high pH environment. Specific examples thereof include, but are not limited to, side-chain-modified polydimethylsiloxane, both-distal end-modified polydimethylsiloxane, one-distal-end-modified polydimethylsiloxane, and side-chain-both-distal-end-modified polydimethylsiloxane. A silicone-based surfactant having a polyoxyethylene group or a polyoxyethylene polyoxypropylene group is particularly preferable because such an agent demonstrates good characteristics as an aqueous surfactant. It is possible to use a polyether-modified silicone-based surfactant as the silicone-based surfactant. An example is a compound in which a polyalkylene oxide structure is introduced into the side chain of the Si site of dimethyl siloxane.

Specific examples of the fluorochemical surfactants include, but are not limited to, perfluoroalkyl sulfonic acid compounds, perfluoroalkyl carboxylic acid compounds, ester compounds of perfluoroalkyl phosphoric acid, adducts of perfluoroalkyl ethylene oxide, and polyoxyalkylene ether polymer compounds having a perfluoroalkyl ether group in its side chain. These are particularly preferable because they do not easily produce foams.

Specific examples of the perfluoroalkyl sulfonic acid compounds include, but are not limited to, perfluoroalkyl sulfonic acid and salts of perfluoroalkyl sulfonic acid.

Specific examples of the perfluoroalkyl carboxylic acid compounds include, but are not limited to, perfluoroalkyl carboxylic acid and salts of perfluoroalkyl carboxylic acid.

Specific examples of the polyoxyalkylene ether polymer compounds having a perfluoroalkyl ether group in its side chain include, but are not limited to, salts of sulfuric acid ester of polyoxyalkylene ether polymer having a perfluoroalkyl ether group in its side chain and salts of polyoxyalkylene ether polymers having a perfluoroalkyl ether group in its side chain. Counter ions of salts in these fluorochemical surfactants are, for example, Li, Na, K, $NH_4$, $NH_3CH_2CH_2OH$, $NH_2(CH_2CH_2OH)_2$, and $NH(CH_2CH_2OH)_3$.

Specific examples of the amphoteric surfactants include, but are not limited to, lauryl aminopropionic acid salts, lauryl dimethyl betaine, stearyl dimethyl betaine, and lauryl dihydroxyethyl betaine.

Specific examples of the nonionic surfactants include, but are not limited to, polyoxyethylene alkyl phenyl ethers, polyoxyethylene alkyl esters, polyoxyethylene alkyl amines, polyoxyethylene alkyl amides, polyoxyethylene propylene block polymers, sorbitan aliphatic acid esters, polyoxyethylene sorbitan aliphatic acid esters, and adducts of acetylene alcohol with ethylene oxides.

Specific examples of the anionic surfactants include, but are not limited to, polyoxyethylene alkyl ether acetates, dodecyl benzene sulfonates, laurates, and polyoxyethylene alkyl ether sulfates.

These can be used alone or in combination.

The silicone-based surfactants has no particular limit and can be suitably selected to suit to a particular application. Specific examples thereof include, but are not limited to, side-chain-modified polydimethyl siloxane, both distal-end-modified polydimethylsiloxane, one-distal-end-modified polydimethylsiloxane, and side-chain-both-distal-end-modified polydimethylsiloxane. In particular, a polyether-modified silicone-based surfactant having a polyoxyethylene group or a polyoxyethylene polyoxypropylene group is particularly preferable because such a surfactant demonstrates good characteristics as an aqueous surfactant.

Any suitably synthesized surfactant and any product thereof available on the market is suitable. Products available on the market can be obtained from Byc Chemie Japan Co., Ltd., Shin-Etsu Silicone Co., Ltd., Dow Corning Toray Co., Ltd., etc., NIHON EMULSION Co., Ltd., Kyoeisha Chemical Co., Ltd., etc.

The polyether-modified silicon-containing surfactant has no particular limit and can be suitably selected to suit to a particular application. For example, a compound is usable in which the polyalkylene oxide structure represented by the following Chemical structure S-1 is introduced into the side chain of the Si site of dimethyl polysiloxane.

Chemical formula S-1

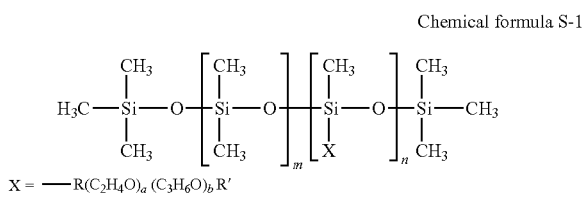

X = ——R(C₂H₄O)ₐ(C₃H₆O)ᵦR'

In the Chemical formula S-1 illustrated above, m, n, a, and b independently represent integers. In addition, R and R' independently represent alkyl groups and alkylene groups.

Specific examples of polyether-modified silicone-based surfactants include, but are not limited to, KF-618, KF-642, and KF-643 (all manufactured by Shin-Etsu Chemical Co., Ltd.), EMALEX-SS-5602 and SS-1906EX (both manufactured by NIHON EMULSION Co., Ltd.), FZ-2105, FZ-2118, FZ-2154, FZ-2161, FZ-2162, FZ-2163, and FZ-2164 (all manufactured by Dow Corning Toray Co., Ltd.), BYK-33 and BYK-387 (both manufactured by BYK Japan KK.), and TSF4440, TSF4452, and TSF4453 (all manufactured by Momentive Performance Materials Inc.).

A fluorochemical surfactant in which the number of carbon atoms replaced with fluorine atoms is 2-16 is preferable and, 4 to 16, more preferable.

Specific examples of the fluorochemical surfactants include, but are not limited to, perfluoroalkyl phosphoric acid ester compounds, adducts of perfluoroalkyl ethylene oxide, and polyoxyalkylene ether polymer compounds having a perfluoroalkyl ether group in its side chain. Of these, polyoxyalkylene ether polymer compounds having a perfluoroalkyl ether group in its side chain are preferable because they do not foam easily and the fluorosurfactant represented by the following Chemical formula F-1 or Chemical formula F-2 is more preferable.

$$CF_3CF_2(CF_2CF_2)_m\text{—}CH_2CH_2O(CH_2CH_2O)_nH \quad \text{Chemical formula F-1}$$

In the Chemical formula F-1, "m" is preferably 0 or an integer of from 1 to 10 and "n" is preferably 0 or an integer of from 1 to 40.

$$C_nF_{2n+1}\text{—}CH_2CH(OH)CH_2\text{—}O\text{—}(CH_2CH_2O)_a\text{—}Y \quad \text{Chemical formula F-2}$$

In the Chemical formula F-2, Y represents H, $C_nF_{2n+1}$, where "n" is an integer of from 1 to 6, $H_2CH(OH)CH_2\text{—}C_nF_{2n|1}$, where n represents an integer of from 4 to 6, or $C_pH_{2p+1}$, where p represents an integer of from 1 to 19. "a" represents an integer of from 4 to 14.

As the fluorochemical surfactant, products available on the market may be used.

Specific examples of the products available on the market include, but are not limited to, SURFLON S-111, SURFLON S-112, SURFLON S-121, SURFLON S-131, SURFLON S-132, SURFLON S-141, and SURFLON S-145 (all manufactured by ASAHI GLASS CO., LTD.); FLUORAD FC-93, FC-95, FC-98, FC-129, FC-135, FC-170C, FC-430, and FC-431 (all manufactured by SUMITOMO 3M); MEGAFACE F-470, F-1405, and F-474 (all manufactured by DIC CORPORATION); ZONYL TBS, FSP, FSA, FSN-100, FSN, FSO-100, FSO, FS-300 UR (all manufactured by E. I. du Pont de Nemours and Company); FT-110, FT-250, FT-251, FT-400S, FT-150, and FT-400SW (all manufactured by NEOS COMPANY LIMITED); POLYFOX PF-136A, PF-156A, PF-151N, PF-154, and PF-159 (manufactured by OMNOVA SOLUTIONS INC.); and UNIDYNE™ DSN-403N (manufactured by DAIKIN INDUSTRIES, Ltd.). Among these, in terms of improvement on print quality, in particular coloring property and permeability, wettability, and uniform dying property on paper, FS-300 of E. I. du Pont de Nemours and Company, FT-110, FT-250, FT-251, FT-400S, FT-150, and FT-400SW of NEOS COMPANY LIMITED, POLYFOX PF-151N of OMNOVA SOLUTIONS INC., and UNIDYNE™ DSN-403N (manufactured by DAIKIN INDUSTRIES, Ltd.) are particularly preferable.

The proportion of the surfactant in ink is not particularly limited and can be suitably selected to suit to a particular application. It is preferably 0.001-5 percent by mass and more preferably 0.05-5 percent by mass in terms of enhancement of wettability and discharging stability and improvement on image quality.

Wax

It is preferable to add wax to the white ink of the present disclosure to impart slippage to an image portion.

Of the wax, polyethylene-based wax emulsion or carnauba wax is preferable in terms of film formation property and slippage in particular when white ink is applied to an image forming portion.

The melting point of the wax is preferably 80-140 degrees C. and more preferably 100-140 degrees C. When the melting point is 80 degrees C. or higher, wax does not excessively melt or coagulate, so that storage stability of white ink is maintained. When the melting point is 140 degrees C. or lower, wax melts sufficiently in room temperature environment, so that slippage is imparted to white ink.

The particle diameter of the wax is preferably 0.01 μm or greater and more preferably 0.01-0.1 μm. When the particle diameter is 0.01 μm or greater, wax particles tend to be oriented to the surface of white ink, thereby imparting slippage to the white ink.

As an example of the polyethylene-based wax emulsion, products available on the market are High-Tech series, manufactured by TOHO Chemical Industry Co., Ltd. and AQUACER SERIES, manufactured by BYK.

Specific examples of carnauba wax available on the market include, but are not limited to, Selosol 524, Torasol, and CN, manufactured by CHUKYO YUSHI CO., LTD.

The proportion of the wax in the white ink is preferably 1-10 percent by mass and more preferably 1-5 percent by mass.

Defoaming Agent

The defoaming agent has no particular limit. For example, silicon-based defoaming agents, polyether-based defoaming agents, and aliphatic acid ester-based defoaming agents are suitable. These can be used alone or in combination. Of these, silicone-based defoaming agents are preferable to easily break foams.

Preservatives and Fungicides

The preservatives and fungicides are not particularly limited. A specific example is 1,2-benzisothiazoline-3-on.

Corrosion Inhibitor

The corrosion inhibitor has not particular limitation. Examples thereof are acid sulfite and sodium thiosulfate.

pH Regulator

The pH regulator has no particular limit. It is preferable to adjust the pH to 7 or higher. Specific examples thereof include, but are not limited to, amines such as diethanol amine and triethanol amine.

The property of the white ink is not particularly limited and can be suitably selected to suit to a particular application. For example, viscosity, dynamic surface tension, pH, etc, are preferable in the following ranges.

The viscosity of the white ink at 25 degrees C. is preferably 5-30 mPa·s and more preferably 5-25 mPa·s to improve print density and text quality and obtain good dischargeability. Viscosity can be measured by, for example, a rotatory viscometer (RE-80L, manufactured by TOKI SANGYO CO., LTD.). The measuring conditions are as follows:

Standard cone rotor (1°34'×R24)
Sample liquid amount: 1.2 mL
Number of rotations: 50 rotations per minute (rpm)
25 degrees C.
Measuring time: three minutes The dynamic surface tension of the white ink is preferably 18-21 mN/m at 25 degrees C. when the bubble life time is 1,500 ms in terms that the white ink is suitably levelized on a recording medium and the drying time of the white ink is shortened. The dynamic surface tension can be measured by, for example, a maximum bubble pressure technique at 25.0 degrees C. using a dynamic surface tensiometer (SITA DynoTester, manufactured by SITA Messtechnik GmbH).

"Bubble life time" is life length of a foam produced according to maximum bubble pressure technique and is also referred to as "surface life length", which is time from when a new interface is produced in a probe front end in the dynamic surface tensiometer until the maximum bubble pressure.

The pH of the white ink is preferably 7-12 and more preferably 8-11 in terms of prevention of corrosion of metal materials adjacent to the white ink.

Ink

The white ink of the present disclosure and ink including a coloring material, an organic solvent (second organic solvent) and water can be used as an ink set. The ink includes black ink and chromatic ink.

The organic solvents, water, coloring materials, resins, and additives for use in the ink are described next.

Organic Solvent (Second Organic Solvent)

There is no specific limitation on the type of the organic solvent (second organic solvent) used in the present disclosure. For example, water-soluble organic solvents are suitable. Specific examples include, but are not limited to, polyols, ethers such as polyol alkylethers and polyol arylethers, nitrogen-containing heterocyclic compounds, amides, amines, and sulfur-containing compounds.

Specific examples of the water-soluble organic solvents include, but are not limited to, polyols such as ethylene glycol, diethylene glycol, 1,2-propanediol, 1,3-propanediol, 1,2-butanediol, 1,3-butanediol, 1,4-butanediol, 2,3-butanediol, 3-methyl-1,3-butane diol, triethylene glycol, polyethylene glycol, polypropylene glycol, 1,2-pentanediol, 1,3-pentanediol, 1,4-pentanediol, 2,4-pentanediol, 1,5-pentanediol, 1,2-hexanediol, 1,6-hexanediol, 1,3-hexanediol, 2,5-hexanediol, 1,5-hexanediol, glycerin, 1,2,6-hexanetriol, 2-ethyl-1,3-hexanediol, ethyl-1,2,4-butane triol, 1,2,3-butanetriol, 2,2,4-trimethyl-1,3-pentanediol, and petriol; polyol alkylethers such as ethylene glycol monoethylether, ethylene glycol monobutylether, diethylene glycol monomethylether, diethylene glycol monoethylether, diethylene glycol monobutylether, tetraethylene glycol monomethylether, and propylene glycol monoethylether; polyol arylethers such as ethylene glycol monophenylether and ethylene glycol monobenzylether; nitrogen-containing heterocyclic compounds such as 2-pyrolidone, N-methyl-2-pyrolidone, N-hydroxyethyl-2-pyrolidone, 1,3-dimethyl-2-imidazolidinone, ϵ-caprolactam, and γ-butyrolactone; amides such as formamide, N-methylformamide, N,N-dimethylformamide, 3-methoxy-N,N-dimethyl propioneamide, and 3-buthoxy-N,N-dimethyl propioneamide; amines such as monoethanolamine, diethanolamine, and triethylamine; sulfur-containing compounds such as dimethyl sulfoxide, sulfolane, and thiodiethanol; propylene carbonate, and ethylene carbonate.

Since the organic solvent serves as a humectant and also imparts a good drying property, it is preferable to use an organic solvent having a boiling point of 250 degrees C. or lower.

Polyol compounds having eight or more carbon atoms and glycol ether compounds are also suitable.

Specific examples of the polyol compounds having eight or more carbon atoms include, but are not limited to, 2-ethyl-1,3-hexanediol and 2,2,4-trimethyl-1,3-pentanediol.

Specific examples of the glycolether compounds include, but are not limited to, polyol alkylethers such as ethyleneglycol monoethylether, ethyleneglycol monobutylether, diethylene glycol monomethylether, diethyleneglycol monoethylether, diethyleneglycol monobutylether, tetraethylglycol monomethylether, propyleneglycol monoethylether; and polyol arylethers such as ethyleneglycol monophenylether and ethyleneglycol monobenzylether.

The polyol compounds having eight or more carbon atoms and glycolether compounds enhance permeability of ink when paper is used as a print medium (recording medium).

The proportion of the organic solvent in ink has no particular limit and can be suitably selected to suit to a particular application. In terms of the drying property and discharging reliability of the ink, the proportion is preferably 10-60 percent by mass and more preferably 20-60 percent by mass.

Water

The proportion of water in the ink is not particularly limited and can be suitably selected to suit to a particular application. For example, in terms of the drying property and discharging reliability of the ink, the proportion is preferably 10-90 percent by mass and more preferably 20-60 percent by mass.

Coloring Material

The coloring material has no particular limit. For example, pigments and dyes are suitable.

The pigment includes inorganic pigments and organic pigments. These can be used alone or in combination. In addition, it is possible to use a mixed crystal.

As the pigments, for example, black pigments, yellow pigments, magenta pigments, cyan pigments, white pigments, green pigments, orange pigments, gloss pigments of gold, silver, etc., and metallic pigments can be used.

As the inorganic pigments, in addition to titanium oxide, iron oxide, calcium oxide, barium sulfate, aluminum hydroxide, barium yellow, cadmium red, and chrome yellow, carbon black manufactured by known methods such as contact methods, furnace methods, and thermal methods can be used.

As the organic pigments, it is possible to use azo pigments, polycyclic pigments (phthalocyanine pigments, perylene pigments, perinone pigments, anthraquinone pigments, quinacridone pigments, dioxazine pigments, indigo pigments, thioindigo pigments, isoindolinone pigments, and quinophthalone pigments, etc.), dye chelates (basic dye type chelates, acid dye type chelates, etc.), nitro pigments, nitroso pigments, and aniline black can be used. Of these pigments, pigments having good affinity with solvents are preferable.

Specific examples of the pigments for black include, but are not limited to, carbon black (C.I. Pigment Black 7) such as furnace black, lamp black, acetylene black, and channel black, metals such as copper, iron (C.I. Pigment Black 11), and titanium oxide, and organic pigments such as aniline black (C.I. Pigment Black 1).

Specific examples of the pigments for color include, but are not limited to, C.I. Pigment Yellow 1, 3, 12, 13, 14, 17, 24, 34, 35, 37, 42 (yellow iron oxide), 53, 55, 74, 81, 83, 95, 97, 98, 100, 101, 104, 108, 109, 110, 117, 120, 138, 150, 153, 155, 180, 185, and 213; C.I. Pigment Orange 5, 13, 16, 17, 36, 43, and 51; C.I. Pigment Red 1, 2, 3, 5, 17, 22, 23, 31, 38, 48:2, 48:2 {Permanent Red 2B(Ca)}, 48:3, 48:4, 49:1, 52:2, 53:1, 57:1 (Brilliant Carmine 6B), 60:1, 63:1, 63:2, 64:1, 81, 83, 88, 101 (rouge), 104, 105, 106, 108 (Cadmium Red), 112, 114, 122 (Quinacridone Magenta), 123, 146, 149, 166, 168, 170, 172, 177, 178, 179, 184, 185, 190, 193, 202, 207, 208, 209, 213, 219, 224, 254, and 264; C.I. Pigment Violet 1 (Rohdamine Lake), 3, 5:1, 16, 19, 23, and 38; C.I. Pigment Blue 1, 2, 15 (Phthalocyanine Blue), 15:1, 15:2, 15:3, 15:4, (Phthalocyanine Blue), 16, 17:1, 56, 60, and 63; C.I. Pigment Green 1, 4, 7, 8, 10, 17, 18, and 36.

The type of dye is not particularly limited and includes, for example, acidic dyes, direct dyes, reactive dyes, basic dyes. These can be used alone or in combination.

Specific examples of the dye include, but are not limited to, C.I. Acid Yellow 17, 23, 42, 44, 79, and 142, C.I. Acid Red 52, 80, 82, 249, 254, and 289, C.I. Acid Blue 9, 45, and 249, C.I. Acid Black 1, 2, 24, and 94, C. I. Food Black 1 and 2, C.I. Direct Yellow 1, 12, 24, 33, 50, 55, 58, 86, 132, 142, 144, and 173, C.I. Direct Red 1, 4, 9, 80, 81, 225, and 227, C.I. Direct Blue 1, 2, 15, 71, 86, 87, 98, 165, 199, and 202, C.I. Direct Black 19, 38, 51, 71, 154, 168, 171, and 195, C.I. Reactive Red 14, 32, 55, 79, and 249, and C.I. Reactive Black 3, 4, and 35.

The proportion of the coloring material in the ink is preferably 0.1-15 percent by mass and more preferably 1-10 percent by mass in terms of enhancement of image density, fixability, and discharging stability.

To disperse a pigment in the ink, for example, a hydrophilic functional group is introduced into the pigment to prepare a self-dispersible pigment, the surface of the pigment is coated with a resin, or a dispersant is used to disperse the pigment.

As a method of introducing a hydrophilic functional group into a pigment to prepare a self-dispersible pigment, it is possible to use, for example, a self-dispersion pigment, etc. in which a functional group such as a sulfone group and a carboxyl group is added to a pigment (e.g., carbon) to make it dispersible in water.

To coat the surface of the pigment with a resin, the pigment is encapsulated by microcapsules to make the pigment dispersible in water. This can be referred to as a resin-coated pigment. In this case, all the pigments to be added to ink are not necessarily coated with a resin. Pigments partially or wholly uncovered with a resin may be dispersed in the ink unless the pigments have an adverse impact.

In a method of using a dispersant to disperse a pigment, for example, a known dispersant of a small molecular weight or a large molecular weight, which is represented by a surfactant, is used to disperse the pigment in ink.

As the dispersant, it is possible to select, for example, an anionic surfactant, a cationic surfactant, a nonionic surfactant, an amphoteric surfactant, etc. depending on a pigment.

Also, a nonionic surfactant (RT-100, manufactured by TAKEMOTO OIL & FAT CO., LTD.) and a formalin condensate of naphthalene sodium sulfonate are suitable as the dispersant.

Those can be used alone or in combination.

Pigment Dispersion

A coloring material may be mixed with materials such as water and an organic solvent to obtain ink. It is also possible to mix a pigment with water, a dispersant, etc., first to prepare a pigment dispersion and thereafter mix the pigment dispersion with materials such as water and organic solvent to manufacture ink.

The pigment dispersion can be obtained by dispersing water, a pigment, a pigment dispersant, and other optional components and adjusting the particle size. It is good to use a dispersing device for dispersion.

The particle diameter of the pigment in the pigment dispersion has no particular limit. For example, the maximum frequency in the maximum number conversion is preferably 20-500 nm and more preferably 20-150 nm to improve dispersion stability of the pigment and ameliorate the discharging stability and image quality such as image density. The particle diameter of the pigment can be measured using a particle size analyzer (Nanotrac Wave-UT151, manufactured by MicrotracBEL Corp).

In addition, the proportion of the pigment in the pigment dispersion is not particularly limited and can be suitably selected to suit a particular application. In terms of improving discharging stability and image density, the proportion is preferably 0.1-50 percent by mass and more preferably 0.1-30 percent by mass.

It is preferable that the pigment dispersion be filtered with a filter, a centrifuge, etc. to remove coarse particles and thereafter degassed.

Resin

The type of the resin contained in the ink has no particular limit. Specific examples thereof include, but are not limited to, urethane resins, polyester resins, acrylic-based resins, vinyl acetate-based resins, styrene-based resins, butadiene-based resins, styrene-butadiene-based resins, vinylchloride-based resins, acrylic styrene-based resins, and acrylic silicone-based resins.

Particles of such resins may be also used. It is possible to mix a resin emulsion in which the resin particles are dispersed in water serving as a dispersion medium with materials such as a coloring material and an organic solvent to obtain ink. The resin particle can be synthesized or is available on the market. These can be used alone or in combination of the resin particles.

The volume average particle diameter of the resin particle is not particularly limited and can be suitably selected to suit to a particular application. The volume average particle diameter is preferably 10-1,000 nm, more preferably 10-200 nm, and furthermore preferably 10-100 nm to obtain good fixability and image hardness.

The volume average particle diameter can be measured by using, for example, a particle size analyzer (Nanotrac Wave-UT151, manufactured by MicrotracBEL Corp.).

The proportion of the resin is not particularly limited and can be suitably selected to suit to a particular application. In terms of fixability and storage stability of ink, it is preferably 1-30 percent by mass and more preferably 5-20 percent by mass to the total content of the ink.

The particle diameter of the solid portion in ink has no particular limit. For example, the maximum frequency in the maximum number conversion is preferably 20-1,000 and more preferably 20-150 nm to ameliorate the discharging stability and image quality such as image density. The solid portion includes resin particles, particles of pigments, etc. The particle diameter can be measured by using a particle size analyzer (Nanotrac Wave-UT151, manufactured by MicrotracBEL Corp).

Additive Agent

Ink may further optionally contain a surfactant, a defoaming agent, a preservative and fungicide, a corrosion inhibitor, a pH regulator, etc.

Surfactant

Examples of the surfactant are silicone-based surfactants, fluorochemical surfactants, amphoteric surfactants, nonionic surfactants, anionic surfactants, etc.

The silicone-based surfactant has no specific limit and can be suitably selected to suit to a particular application.

Of these, preferred are silicone-based surfactants which are not decomposed even in a high pH environment.

Specific examples thereof include, but are not limited to, side-chain-modified polydimethylsiloxane, both-distal end-modified polydimethylsiloxane, one-distal-end-modified polydimethylsiloxane, and side-chain-both-distal-end-modified polydimethylsiloxane. A silicone-based surfactant having a polyoxyethylene group or a polyoxyethylene polyoxypropylene group is particularly preferable because such an agent demonstrates good characteristics as an aqueous surfactant. It is possible to use a polyether-modified silicone-based surfactant as the silicone-based surfactant. An example is a compound in which a polyalkylene oxide structure is introduced into the side chain of the Si site of dimethyl silooxane.

Specific examples of the fluorochemical surfactants include, but are not limited to, perfluoroalkyl sulfonic acid compounds, perfluoroalkyl carboxylic acid compounds, ester compounds of perfluoroalkyl phosphoric acid, adducts of perfluoroalkyl ethylene oxide, and polyoxyalkylene ether polymer compounds having a perfluoroalkyl ether group in its side chain. These are particularly preferable because they do not easily produce foams.

Specific examples of the perfluoroalkyl sulfonic acid compounds include, but are not limited to, perfluoroalkyl sulfonic acid and salts of perfluoroalkyl sulfonic acid.

Specific examples of the perfluoroalkyl carboxylic acid compounds include, but are not limited to, perfluoroalkyl carboxylic acid and salts of perfluoroalkyl carboxylic acid.

Specific examples of the polyoxyalkylene ether polymer compounds having a perfluoroalkyl ether group in its side chain include, but are not limited to, salts of sulfuric acid ester of polyoxyalkylene ether polymer having a perfluoroalkyl ether group in its side chain and salts of polyoxyalkylene ether polymers having a perfluoroalkyl ether group in its side chain. Counter ions of salts in these fluorochemical surfactants are, for example, Li, Na, K, $NH_4$, $NH_3CH_2CH_2OH$, $NH_2(CH_2CH_2OH)_2$, and $NH(CH_2CH_2OH)_3$.

Specific examples of the amphoteric surfactants include, but are not limited to, lauryl aminopropionic acid salts, lauryl dimethyl betaine, stearyl dimethyl betaine, and lauryl dihydroxyethyl betaine.

Specific examples of the nonionic surfactants include, but are not limited to, polyoxyethylene alkyl phenyl ethers, polyoxyethylene alkyl esters, polyoxyethylene alkyl amines, polyoxyethylene alkyl amides, polyoxyethylene propylene block polymers, sorbitan aliphatic acid esters, polyoxyethylene sorbitan aliphatic acid esters, and adducts of acetylene alcohol with ethylene oxides.

Specific examples of the anionic surfactants include, but are not limited to, polyoxyethylene alkyl ether acetates, dodecyl benzene sulfonates, laurates, and polyoxyethylene alkyl ether sulfates.

These can be used alone or in combination.

The silicone-based surfactants has no particular limit and can be suitably selected to suit to a particular application.

Specific examples thereof include, but are not limited to, side-chain-modified polydimethyl siloxane, both distal-end-modified polydimethylsiloxane, one-distal-end-modified polydimethylsiloxane, and side-chain-both-distal-end-modified polydimethylsiloxane. In particular, a polyether-modified silicone-based surfactant having a polyoxyethylene group or a polyoxyethylene polyoxypropylene group is particularly preferable because such a surfactant demonstrates good characteristics as an aqueous surfactant.

Any suitably synthesized surfactant and any product thereof available on the market is suitable. Products available on the market can be obtained from Byc Chemie Japan Co., Ltd Shin-Etsu Silicone Co., Ltd., Dow Corning Toray Co., Ltd., etc., NIHON EMULSION Co., Ltd., Kyoeisha Chemical Co., Ltd., etc.

The polyether-modified silicon-containing surfactant has no particular limit and can be suitably selected to suit to a particular application. For example, a compound is usable in which the polyalkylene oxide structure represented by the following Chemical structure S-1 is introduced into the side chain of the Si site of dimethyl polysiloxane.

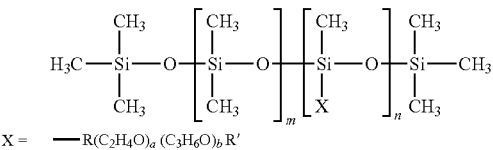

Chemical formula S-1

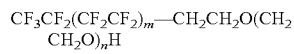

In the Chemical formula S-1 illustrated above, m, n, a, and b independently represent integers. In addition, R and R' independently represent alkyl groups and alkylene groups.

Specific examples of polyether-modified silicone-based surfactants include, but are not limited to, KF-618, KF-642, and KF-643 (all manufactured by Shin-Etsu Chemical Co., Ltd.), EMALEX-SS-5602 and SS-1906EX (both manufactured by NIHON EMULSION Co., Ltd.), FZ-2105, FZ-2118, FZ-2154, FZ-2161, FZ-2162, FZ-2163, and FZ-2164 (all manufactured by Dow Corning Toray Co., Ltd.), BYK-33 and BYK-387 (both manufactured by BYK Japan KK.), and TSF4440, TSF4452, and TSF4453 (all manufactured by Momentive Performance Materials Inc.).

A fluorochemical surfactant in which the number of carbon atoms replaced with fluorine atoms is 2-16 is preferable and, 4 to 16, more preferable.

Specific examples of the fluorochemical surfactants include, but are not limited to, perfluoroalkyl phosphoric acid ester compounds, adducts of perfluoroalkyl ethylene oxide, and polyoxyalkylene ether polymer compounds having a perfluoroalkyl ether group in its side chain.

Of these, polyoxyalkylene ether polymer compounds having a perfluoroalkyl ether group in its side chain are preferable because they do not foam easily and the fluorosurfactant represented by the following Chemical formula F-1 or Chemical formula F-2 is more preferable.

$$CF_3CF_2(CF_2CF_2)_m\text{—}CH_2CH_2O(CH_2CH_2O)_nH$$ Chemical formula F-1

In the Chemical formula F-1, "m" is preferably 0 or an integer of from 1 to 10 and "n" is preferably 0 or an integer of from 1 to 40.

$$C_nF_{2n+1}\text{—}CH_2CH(OH)CH_2\text{—}O\text{—}(CH_2CH_2O)_a\text{—}Y$$ Chemical formula F-2

In the compound represented by the chemical formula F-2, Y represents H or $CnF_{2n+1}$, where n represents an integer of 1-6, or $CH_2CH(OH)CH_2\text{—}CnF_{2n+1}$, where n represents an integer of 4-6, or $CpH_{2p+1}$, where p is an integer of 1-19, "a" represents an integer of 4-14.

As the fluorochemical surfactant, products available on the market may be used.

Specific examples of the products available on the market include, but are not limited to, SURFLON S-111, SURFLON S-112, SURFLON S-121, SURFLON S-131, SURFLON S-132, SURFLON S-141, and SURFLON S-145 (all manufactured by ASAHI GLASS CO., LTD.); FLUORAD FC-93, FC-95, FC-98, FC-129, FC-135, FC-170C, FC-430, and FC-431 (all manufactured by SUMITOMO 3M); MEGAFACE F-470, F-1405, and F-474 (all manufactured by DIC CORPORATION); ZONYL TBS, FSP, FSA, FSN-100, FSN, FSO-100, FSO, FS-300 UR (all manufactured by E. I. du Pont de Nemours and Company); FT-110, FT-250, FT-251, FT-400S, FT-150, and FT-400SW (all manufactured by NEOS COMPANY LIMITED); POLYFOX PF-136A, PF-156A, PF-151N, PF-154, and PF-159 (manufactured by OMNOVA SOLUTIONS INC.); and UNIDYNE™ DSN-403N (manufactured by DAIKIN INDUSTRIES, Ltd.). Among these, in terms of improvement on print quality, in particular coloring property and permeability, wettability, and uniform dying property on paper, FS-300 of E. I. du Pont de Nemours and Company, FT-110, FT-250, FT-251, FT-400S, FT-150, and FT-400SW of NEOS COMPANY LIMITED, POLYFOX PF-151N of OMNOVA SOLUTIONS INC., and UNIDYNE™ DSN-403N (manufactured by DAIKIN INDUSTRIES, Ltd.) are particularly preferable.

The proportion of the surfactant in ink is not particularly limited and can be suitably selected to suit to a particular application. It is preferably 0.001-5 percent by mass and more preferably 0.05-5 percent by mass in terms of excellent wettability and discharging stability and improvement on image quality.

Defoaming Agent

The defoaming agent has no particular limit. For example, silicon-based defoaming agents, polyether-based defoaming agents, and aliphatic acid ester-based defoaming agents are suitable. These can be used alone or in combination. Of these, silicone-based defoaming agents are preferable to easily break foams.

Preservatives and Fungicides

The preservatives and fungicides are not particularly limited. A specific example is 1,2-benzisothiazoline-3-on.

Corrosion Inhibitor

The corrosion inhibitor has not particular limitation. Examples thereof are acid sulfite and sodium thiosulfate.

pH Regulator

The pH regulator has no particular limit. It is preferable to adjust the pH to 7 or higher. Specific examples thereof include, but are not limited to, amines such as diethanol amine and triethanol amine.

The property of the ink is not particularly limited and can be suitably selected to suit to a particular application. For example, viscosity, surface tension, pH, etc, are preferable in the following ranges.

The viscosity of the ink at 25 degrees C. is preferably 5-30 mPa·s and more preferably 5-25 mPa·s to improve print density and text quality and obtain good dischargeability. Viscosity can be measured by, for example, a rotatory viscometer (RE-80L, manufactured by TOKI SANGYO CO., LTD.). The measuring conditions are as follows:

Standard cone rotor (1°34'×R24)
Sample liquid amount: 1.2 mL
Number of rotations: 50 rotations per minute (rpm)
25 degrees C.
Measuring time: three minutes The surface tension of the ink is preferably 35 mN/m or less and more preferably 32 mN/m or less at 25 degrees C. in terms that the ink is suitably levelized on a recording medium and the drying time of the ink is shortened.

The pH of the ink is preferably 7-12 and more preferably 8-11 in terms of prevention of corrosion of metal materials including the ink.

The white ink of the present disclosure can be used in combination with the ink and various processing fluids.

As the processing fluid, examples are pre-processing fluid and post-processing fluid.

Pre-Processing Fluid

The pre-processing fluid includes a flocculant, an organic solvent, water, and optional materials such as a surfactant, a defoaming agent, a pH regulator, a preservatives and fungicides and a corrosion inhibitor.

The organic solvent, the surfactant, the defoaming agent, the pH regulator, the preservatives and fungicides, and the corrosion inhibitor can be the same material as those for use in the ink. Also, other materials for use in known processing fluid can be used.

The type of the flocculant is not particularly limited. For example, water-soluble cationic polymers, acids, and multivalent metal salts are suitable.

Processing Fluid

The post-processing fluid has no particular limit. It is preferable that the post-processing fluid can form a transparent layer. Materials such as organic solvents, water, resins, surfactants, defoaming agents, pH regulators, preservatives and fungicides, corrosion inhibitors, etc. are suitably selected based on a necessity basis and mixed to obtain the post-processing fluid.

The post-processing fluid can be applied to the entire recording area formed on a recording medium or only the area on which an ink image is formed.

Recording Medium

The recording medium for use in recording is not particularly limited. Specific examples thereof include, but are not limited to, plain paper, gloss paper, special paper, cloth, film, transparent sheets, printing paper for general purpose.

Recording Device and Recording Method

The white ink of the present disclosure can be suitably applied to various recording devices employing an inkjet recording method, such as printers, facsimile machines, photocopiers, multifunction peripherals (serving as a printer, a facsimile machine, and a photocopier), and 3D model manufacturing devices (3D printers, additive manufacturing device).

In the present disclosure, the recording device and the recording method represent a device capable of discharging the white ink, the ink, various processing fluids, etc. to a recording medium and a method of recording an image on the recording medium using the device, respectively.

The recording medium means an article to which the white ink, the ink or various processing fluids can be attached at least temporarily.

The recording device may further optionally include a device relating to feeding, conveying, and ejecting the recording medium and other devices referred to as a pre-processing device, a post-processing device, etc. in addition to the head portion to discharge the white ink, etc.

The recording device and the recording method may further optionally include a heater for use in the heating process and a drier for use in the drying process.

For example, the heating device and the drying device include devices including heating and drying the print surface of a recording medium and the opposite surface thereof. The heating device and the drying device are not particularly limited. For example, a fan heater and an infra-red heater can be used. Heating and drying can be conducted before, in the middle of, and after printing. The heating temperature in the heating process and the drying process is preferably 50-90 degrees C. and more preferably 70-90 degrees C. The heating time is preferably 5-60 seconds and more preferably 10-60 seconds.

In the present disclosure, the decrease ratio of the luminosity ($L^*$) of a film having a thickness of 2.2-2.8 μm prepared by drying the white ink at 70 degrees C. to a film having a thickness of 2.2-2.8 μm prepared by drying the white ink at 90 degrees C. is 10 percent or less.

In addition, the recording device and the recording method are not limited to those producing meaningful visible images such as texts and figures with the ink. For example, the recording device and the recording method can produce patterns like geometric design and 3D images.

In addition, the recording device includes both a serial type device in which the liquid discharging head is caused to move and a line type device in which the liquid discharging head is not moved, unless otherwise specified.

Furthermore, in addition to the desktop type, this recording device includes a wide device capable of printing images on a large recording medium such as AO and a continuous printer capable of using continuous paper wound up in a roll form as recording media.

Figure 2:
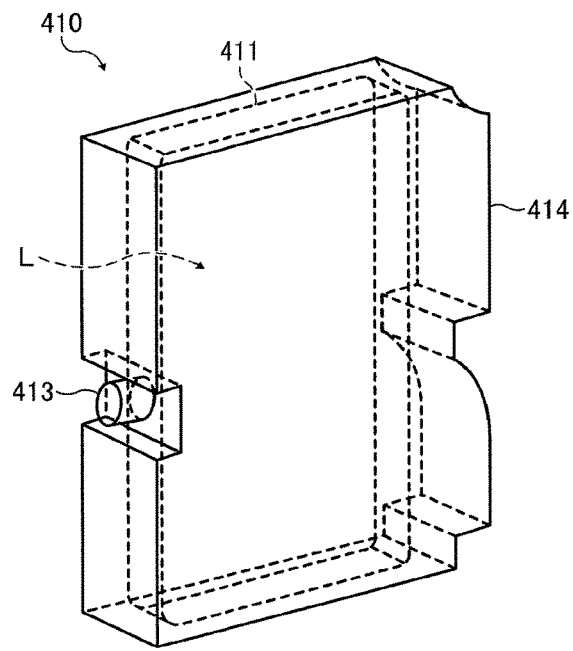
FIG. 2 is a diagram illustrating a perspective view of the main tank illustrated in FIG. 1.

The recording device of the present disclosure is described using an example with reference to FIG. 1 and FIG. 2. FIG. 1 is a diagram illustrating a side view of the recording device. FIG. 2 is a diagram illustrating a perspective view of the main tank. An image forming apparatus 400 as an example of the recording device is a serial type image forming apparatus. A mechanical unit 420 is disposed in an exterior 401 of the image forming apparatus 400. Each ink accommodating unit (ink container) 411 of each main tank 410 (410k, 410c, 410m, 410y, 410W) for each color of black (K), cyan (C), magenta (M), yellow (Y), and white (W) is made of a packing member such as aluminum laminate film. The ink accommodating unit 411 is accommodated in, for example, a plastic housing unit 414. As a result, the main tank 410 is used as an ink cartridge of each color.

Each ink discharging outlet 413 of the main tank 410 communicates with a discharging head 434 for each color via a supplying tube 436 for each color so that the ink can be discharged from the discharging head 434 to a recording medium. In addition, the image forming apparatus 400 includes a drying mechanism 501 (a heater to warm a medium before printing, a drum heater or drier to dry the medium after printing).

In the present disclosure, the discharging sequence of inks can be changed depending on the usage conditions of a user. For example, a background is created by applying white ink first on color paper and thereafter other color ink can be printed thereon.

This recording device may include not only a portion to discharge ink but also a device referred to as a pre-processing device, a post-processing device, etc.

As an example of the pre-processing device and the post-processing device, as in the case of the ink such as black (K), cyan (C), magenta (M), and yellow (Y), the pre-processing device and the post-processing device may further include a liquid accommodating unit including a pre-processing fluid and/or a post-processing fluid to discharge the pre-processing fluid and/or the post-processing fluid according to an inkjet printing method.

As another example of the pre-processing device and the post-processing device, it is suitable to dispose a pre-processing device and a post-processing device which do not employ the inkjet printing method but a blade coating method, a roll coating method, or a spray coating method.

How to use the ink is not limited to the inkjet printing method. Specific examples of such methods other than the inkjet printing method include, but are not limited to, blade coating methods, gravure coating methods, bar coating methods, roll coating methods, dip coating methods, curtain coating methods, slide coating methods, die coating methods, and spray coating methods.

The present disclosure relates to the white ink of the following 1 and also includes the following 2 to 10 as embodiments.

1. A white ink including a hollow resin particle, one or more first organic solvents, an acrylic silicone-based resin, a surfactant, and water. Luminosity (L*) of each of a first dried film having a thickness of 2.2-2.8 μm prepared by drying the white ink at 70 degrees C. and a second dried film having a thickness of 2.2-2.8 μm prepared by drying the white ink at 90 degrees C. is 50 or greater. The decrease ratio of the luminosity (L*) of the second dried film to the first dried film is 10 percent or less.

2. The white ink according to 1 mentioned above, wherein the mixing SP of a solution of the first organic solvent and the water of the white ink is 17.0-20.3 $(cal/cm^3)^{0.5}$.

3. The white ink according to 1 or 2 mentioned above, wherein the glass transition temperature of the acrylic silicone-based resin is 30 degrees or lower.

4. The white ink according to any one of 1-3 mentioned above, wherein the dynamic surface tension of the white ink is 18-21 mN/m at a bubble life time of 1,500 msec.

5. The white ink according to any one of 1-4 mentioned above, wherein the hydrogen bond term of each of the first organic solvent included in the white ink is 3-6.8 $(cal/cm^3)^{0.5}$ and the boiling point of each of the first organic solvent is 150-300 degrees C.

6. The white ink according to any one of 1-5 mentioned above, wherein the first organic solvent includes at least one of 1,2-propane diol, 1,3-propane diol, 1,2-butane diol, 1,3-butane diol, isoprene glycol, and an oxetane compound.

7. The white ink according to any one of 1-6 mentioned above, wherein the mass ratio of the acrylic silicone-based resin to the hollow resin particle is 0.25 to 1.

8. The white ink according to any one of 1-7 mentioned above, further including wax. The wax includes a polyethylene-based wax emulsion or carnauba wax and the melting point of the wax is 80-140 degrees C.

9. An ink set including a white ink including a hollow resin particle, an organic solvent, an acrylic silicone-based resin, a surfactant, and water; and an ink including a coloring material, an organic solvent, and water.

The luminosity (L*) of each of a first film having a thickness of 2.2-2.8 μm prepared by drying the white ink at 70 degrees C. and a second film having a thickness of 2.2-2.8 μm prepared by drying the white ink at 90 degrees C. is 50 or greater and the decrease ratio of the luminosity (L*) of the second film to the first film is 10 percent or less.

10. An inkjet recording method including: a step of discharging the white ink and the ink of the ink set mentioned in 9 mentioned above by applying heat energy or mechanical energy to the white ink and the ink to print an image on a recording medium and a step of drying the recording medium.

Having generally described preferred embodiments of this invention, further understanding can be obtained by reference to certain specific examples which are provided herein for the purpose of illustration only and are not intended to be limiting. In the descriptions in the following examples, the numbers represent weight ratios in parts, unless otherwise specified.

EXAMPLES

Next, the present disclosure is described in detail with reference to Examples and Comparative Examples but not limited thereto. "Percent" in Examples means "percent by mass".

Preparation of Chromatic Ink

Preparation of Aqueous Solution A of Water-Soluble Polymer 10 percent by mass of a copolymer of α-olefin-maleic anhydride (T-YP-112, manufactured by SEIKO PMC CORPORATION), 17.34 percent by mass of 1 normal LiOH aqueous solution, and 72.66 percent by mass of deionized water were mixed, heated, and stirred, by a stirrer. Thereafter, a minute amount of insoluble materials were filtrated with a filter having an average hole diameter of 5 μm to prepare aqueous solution A of water-soluble polymer.

Preparation of Liquid Dispersion of Cyan Pigment Surfactant

Polyoxyethylene styrenephenyl ether (nonionic surfactant, NOIGEN EA-177, manufactured by DKS Co. Ltd.) in an amount of 10 percent by mass was dissolved in deionized water in an amount of 49.98 percent by mass. Thereafter, phthalocyanine pigment (C.I. Pigment Blue 15:3, manufactured by Dainichiseika Color & Chemicals Mfg. Co., Ltd.) in an amount of 30 percent by mass was admixed. Subsequent to sufficient moisturizing, a wet-type dispersing device (KDL A type, DYNO-MILL, manufactured by Willy A. Bachofen AG), was filled with zirconia beads having a diameter of 0.5 mm to conduct dispersion for two hours at 2,000 rpm to obtain a primary pigment dispersion.

Next, aqueous solution A of water-soluble polymer in an amount of 7.51 percent by mass and a water-soluble polyester resin (Nichigo-POLYESTER W-0030, manufactured by The Nippon Synthetic Chemical Industry Co., Ltd.) in an amount of 2.51 percent by mass were added to the primary pigment dispersion followed by sufficient stirring to obtain a liquid dispersion of cyan pigment surfactant. The average particle diameter (D50) of the pigment in the thus-obtained liquid dispersion of cyan pigment surfactant was measured, which was 78 nm. The average particle diameter (D50) was measured by using a particle size distribution measuring instrument (NANOTRAC UPA-EX150, manufactured by NIKKTSO CO., LTD.).

The prescription of the liquid dispersion of cyan pigment surfactant is shown in Table A.

TABLE A

| | Content ratio (percent by mass) |
|---|---|
| Polyoxyethylene styrenephenyl ether | 10 |
| Deionized water | 49.98 (rest) |
| Phthalocyanine pigment | 30 |
| Aqueous solution of water-soluble polymer | 7.51 |
| Water-soluble polyester resin | 2.51 |

Preparation of Chromatic Ink

The organic solvent, surfactant, defoaming agent, pH regulator, antibacterial agent, corrosion inhibitor, and water shown in Table 1 were uniformly mixed for one hour.

Next, the resin and the liquid dispersion of cyan pigment surfactant were added followed by stirring for one hour so that the system was uniformly mixed.

The thus-obtained mixture was filtrated with a polyvinilydene fluoride membrane filter having an average hole diameter of 0.8 μm under pressure to remove coarse particles and dust to obtain a chromatic ink. In the chromatic ink, the coloring material was added in such a manner that the solid portion of the coloring material in the liquid dispersion of cyan pigment surfactant accounted for 5 percent by mass.

As to the particle diameter of the coloring material for use in the present disclosure, a measuring sample prepared by diluting with pure water in such a manner that the solid portion concentration (mass concentration) in the measuring sample was 0.01 percent by mass was measured by a particle size distribution measuring instrument (Nanotrac, UPA-EX150, manufactured by NIKKISO CO., LTD.). The measuring result was 120 nm. The average particle diameter means 50 percent average particle diameter (D50).

Examples 1 to 22 and Comparative Examples 1 to 5

Preparation of White Ink

First, the organic solvent, surfactant, defoaming agent, antibacterial agent, corrosion inhibitor, and water shown in Table 1 were uniformly mixed for one hour. Next, the resin and the wax were added followed by stirring for one hour so that the system was uniformly mixed. Thereafter, the hollow resin particle was added followed by stirring for one hour so that the system was uniformly mixed. The thus-obtained mixture was filtrated with a polyvinilydene fluoride membrane filter having an average hole diameter of 5 μm under pressure to remove coarse particles and dust. Thus, white ink was obtained.

Organic Solvent

Organic solvent A (glycerin, SP value: 16.4 $(cal/cm^3)^{0.5}$, hydrogen bond term: 6.8 $(cal/cm^3)^{0.5}$, boiling point: 290 degrees C.)

Organic solvent B (1,2-propane diol, SP value: 13.5 $(cal/cm^3)^{0.5}$, hydrogen bond term: 5.2 $(cal/cm^3)^{0.5}$, boiling point: 178 degrees C.)

Organic solvent C (1,3-propane diol, SP value: 13.7 $(cal/cm^3)^{0.5}$, hydrogen bond term: 5.7 $(cal/cm^3)^{0.5}$, boiling point: 214 degrees C.)

Organic solvent D (1,2-butane diol, SP value: 12.8 $(cal/cm^3)^{0.5}$, hydrogen bond term: 4.6 $(cal/cm^3)^{0.5}$, boiling point: 194 degrees C.)

Organic solvent E (1,3-butane diol, SP value: 12.8 $(cal/cm^3)^{0.5}$, hydrogen bond term: 5.1 $(cal/cm^3)^{0.5}$, boiling point: 208 degrees C.)

Organic solvent F (isoprene glycol, SP value: 12.1 $(cal/cm^3)^{0.5}$, hydrogen bond term: 4.0 $(cal/cm^3)^{0.5}$, boiling point: 203 degrees C.)

Organic solvent G (3-ethyl-3-hydroxymethyl oxetane, SP value: 11.0 $(cal/cm^3)^{0.5}$, hydrogen bond term: 3.0 $(cal/cm^3)^{0.5}$, boiling point: 246 degrees C.)

Organic solvent H (3-methoxy-N,N-dimethyl propionamide, Equamide M100, SP value: 9.2 $(cal/cm^3)^{0.5}$, hydrogen bond term: 2.3 $(cal/cm^3)^{0.5}$, boiling point: 246 degrees C.)

Deionized Water

Deionized water (SP value: 23.4 $(cal/cm^3)^{0.5}$, hydrogen bond term: 10.1 $(cal/cm^3)^{0.5}$, boiling point: 203 degrees C.)

Hollow Resin Particle

ROPAQUE™ ULTR E (resin, manufactured by Rohm and Haas)

Acrylic silicone-based resin A (RKP-02: TG=−7 degrees C., manufactured by TOYOCHEM CO LTD.)

Acrylic silicone-based resin B (W5348, TG=30 degrees C., manufactured by TOYOCHEM CO., LTD.)

Acrylic silicone-based resin C (W4732, TG=45 degrees C., manufactured by TOYOCHEM CO., LTD.)

Urethane-based resin (UWS145, Tg=−45 degrees C., manufactured by Sanyo Chemical Industries, Ltd.)

Wax

Polyethylene-based wax emulsion A (NOPCOAT PEM-17, melting point 105 degrees C., manufactured by SAN NOPCO LIMITED)

Polyethylene-based wax emulsion A (NOPCOMARU MS-40, melting point 79 degrees C., manufactured by SAN NOPCO LIMITED)

Carnauba wax (Selosol 524, melting point: 83 degrees C., manufactured by CHUKYO YUSHI CO., LTD.)

Surfactant

Silicone-based surfactant (TEGO WET-270, manufactured by TOMOE Engineering Co., Ltd.)

Fluorochemical surfactant (UNIDYNE™ DSN-403N, manufactured by DAIKIN INDUSTRIES, Ltd.)

Alkyl-based surfactant (EMULGEN LS-106, manufactured by Kao Corporation)

Defoaming Agent

EnviroGem® AD-01, manufactured by Nissin Chemical Industry Co., Ltd.

Antibacterial Agent

LV (S), manufactured by AVECIA GROUP

Print Method

White ink was discharged to a recording medium (quality color paper, LUMINA COLOR BLACK 127 gsm, manufactured by TAKEO Co., Ltd.) by a liquid discharging device (IPSIO GXe5500, manufactured by Ricoh Company Ltd.) and dried at the drying temperature and for the drying time shown in Table 1.

Thereafter, chromatic ink was discharged onto the white ink image and dried temperature and the drying time shown in Table 1.

The print chart was a square image of 3 cm×3 cm formed with dot patterns.

This was determined as the print sample.

Properties of the print sample of the solid image of 3 cm×3 cm formed with the dot patterns was evaluated according to the following methods.

Luminosity of White Ink Solid Portion and Luminosity of Chromatic Ink Solid Portion Luminosity (L*) of the white ink solid portion after drying the white ink and luminosity (L*) of the chromatic ink solid portion after drying the chromatic ink were measured. The luminosity of the solid portion of the solid image of 3 cm×3 cm formed with dot patterns was measured by using a spectrophotometric densitometer (939, manufactured by X-Rite). As the value of luminosity increases, the crashing of hollow resin particles is suppressed.

White Ink Layer Thickness and Decrease Ratio of Luminosity

White ink was similarly discharged and printed. Thereafter, the thickness of the white ink layer obtained by drying at 70 degrees C. for 60 seconds and the luminosity of the white ink solid portion after drying and the thickness of the white ink layer obtained by drying at 90 degrees C. for 60 seconds and the luminosity of the white ink solid portion after drying were measured and the decrease ratio of luminosity was calculated.

The cross section of the solid portion of the solid image of 3 cm×3 cm formed with dot patterns was cut by a cutter. The cross section was observed with a microscope (VHX-5000, manufactured by KEYENCE CORPORATION) to measure the thickness.

Fixability of White Ink

After printing a solid image of white ink of 3 cm×3 cm formed with dot patterns, the image was dried at the drying temperature and the drying time shown in Table 1 and the image sample mentioned above was left undone for one day and one night at room temperature. Thereafter, the solid portion of the print sample was abraded by a clock meter (manufactured by TOYO SEIKI KOGYO CO. LTD.) to which a cloth was attached. After the abrasion, the image density was measured by a spectrophotometric densitometer (939, manufactured by X-Rite). In addition, the non-printed portion of the medium and the image density before the abrasion were similarly measured. The calibration curve was created with a fixing ratio of the image density at the non-printed site 0 percent and the fixing ratio of the image density before the abrasion 100 percent. Thus, the fixing ratio of the image density after the abrasion was calculated. As the value of the fixability increases, the fixability of the image becomes better.

Discharging Stability

After printing a solid portion of a solid image of white ink of 3 cm×3 cm formed with dot patterns, the print head of the white ink was left undone with no cap thereon for 30 minutes. Thereafter, the same chart was printed and the number of the nozzles which had failed to discharge the ink out of the all of 192 nozzles was separated into three for evaluation.

G (Good): No non-discharging nozzle
M (Marginal): 5 or less non-discharging nozzles
P (Poor): More than 5 non-discharging nozzles

TABLE 1

| | | | SP value | Comparative Example 1 | Comparative Example 2 | Comparative Example 3 | Comparative Example 4 | Comparative Example 5 |
|---|---|---|---|---|---|---|---|---|
| Chromatic ink | Coloring material | Liquid dispersion of cyan pigment surfactant | | 5.0 | 5.0 | 5.0 | 5.0 | 5.0 |
| | Organic solvent | Organic solvent G | 11.0 | 30.0 | 30.0 | 30.0 | 30.0 | 30.0 |
| | | Organic solvent H | 9.2 | 10.0 | 10.0 | 10.0 | 10.0 | 10.0 |
| | | Octane diol | | 2.0 | 2.0 | 2.0 | 2.0 | 2.0 |
| | Resin | Acrylic silicone-based resin C | | 5.0 | 5.0 | 5.0 | 5.0 | 5.0 |
| | Surfactant | Silicone-based surfactant | | 2.0 | 2.0 | 2.0 | 2.0 | 2.0 |
| | Defoaming agent | Defoaming agent | | 4.7 | 4.7 | 4.7 | 4.7 | 4.7 |
| | pH regulator | 2-amino-2-ethyl-1,3-propane diol | | 0.5 | 0.5 | 0.5 | 0.5 | 0.5 |
| | Antibacterial Agent | Antibacterial Agent | | 1.0 | 1.0 | 1.0 | 1.0 | 1.0 |
| | Corrosion inhibitor | Benzotriazoles | | 1.0 | 1.0 | 1.0 | 1.0 | 1.0 |

TABLE 1-continued

| | | | | | | | | |
|---|---|---|---|---|---|---|---|---|
| | Water | Deionized water | 23.4 | 38.8 | 38.8 | 38.8 | 38.8 | 38.8 |
| | | Total | | 100.0 | 100.0 | 100.0 | 100.0 | 100.0 |
| | Mixing SP value (cal/cm$^3$)$^{0.5}$ of organic solvent and water in chromatic ink | | | 16.9 | 16.9 | 16.9 | 16.9 | 16.9 |
| White Ink | Hollow resin particle | Hollow resin particle | | 8.5 | 8.5 | 8.5 | 8.5 | 8.5 |
| | Organic solvent | Organic solvent A | 16.4 | | | | | |
| | | Organic solvent B | 13.5 | | | | | |
| | | Organic solvent C | 13.7 | | | | | |
| | | Organic solvent D | 12.8 | | 35.0 | 35.0 | 35.0 | 35.0 |
| | | Organic solvent E | 12.8 | | | | | |
| | | Organic solvent F | 12.1 | | | | | |
| | | Organic solvent G | 11.0 | | | | | |
| | | Organic solvent H | 9.2 | 41.5 | | | | |
| | | Octane diol | | 2.0 | 2.0 | 2.0 | 2.0 | 2.0 |
| | Resin | Acrylic silicone-based resin A | | 2.1 | | | 2.1 | 2.1 |
| | | Acrylic silicone-based resin B | | | | | | |
| | | Acrylic silicone-based resin C | | | 2.1 | | | |
| | | Urethane resin | | | | 2.1 | | |
| | Wax | Polyethylene-based wax emulsion A | | | | | | |
| | | Carnauba wax: Polyethylene-based wax emulsion B | | | | | | |
| | Surfactant | Silicone-based surfactant | | 1.0 | 1.0 | 1.0 | 0.25 | |
| | | Fluorochemical surfactant | | | | | | |
| | | Alkyl-based surfactant | | | | | | 1.0 |
| | Defoaming agent | Defoaming agent | | 2.3 | 2.3 | 2.3 | 0.6 | 2.3 |
| | Antibacterial Agent | Antibacterial Agent | | 1.0 | 1.0 | 1.0 | 1.0 | 1.0 |
| | Corrosion Inhibitor | Benzotnazoles | | 1.0 | 1.0 | 1.0 | 1.0 | 1.0 |
| | Water | Deionized water | 23.4 | 40.5 | 47.0 | 47.0 | 49.5 | 47.0 |
| | | Total | | 100.0 | 100.0 | 100.0 | 100.0 | 100.0 |
| | Mixing SP value (cal/cm$^3$)$^{0.5}$ of mixture of Organic solvent in white ink + water | | | 16.2 | 18.9 | 18.9 | 19.0 | 18.9 |
| | Dynamic surface tension (1,500 msec) (mN/m) of white ink | | | 20.6 | 20.6 | 20.6 | 25.9 | 28.2 |
| | Mass ratio of resin in white ink to hollow resin particle | | | 0.25 | 0.25 | 0.25 | 0.25 | 0.25 |
| | Drying temperature (degrees C.) | | | 70 | 70 | 70 | 70 | 70 |
| | Drying time (second) | | | 60 | 60 | 60 | 60 | 60 |
| Evaluation Results | Luminosity (L*) of white ink solid portion at drying temperature for drying time | | | 30.3 | 42.4 | 45.3 | 35.7 | 32.1 |
| | White ink layer thickness (μm) when dried at 70 degrees C. for 60 seconds | | | 2.3 | 2.5 | 2.4 | 2.7 | 2.8 |
| | White ink layer thickness (μm) when dried at 90 degrees C. for 60 seconds | | | 2.2 | 2.4 | 2.3 | 2.4 | 2.5 |
| | White ink layer thickness (μm) when dried at 70 degrees C. for 60 seconds | | | 30.3 | 42.4 | 45.3 | 35.7 | 32.1 |
| | Luminosity (L*) at white ink solid portion when dried at 90 degrees C. for 60 seconds | | | 26.7 | 40.6 | 23.0 | 34.3 | 30.8 |
| | Decrease ratio (percent) of white degree (L*) | | | 11.9% | 4.2% | 49.2% | 3.9% | 4.0% |

TABLE 1-continued

|  |  |  |  |  |  |  |  |
|---|---|---|---|---|---|---|---|
|  | Luminosity of Chromatic Ink Solid Portion |  | 11.2 | 20.9 | 24.4 | 12.4 | 10.7 |
|  | Transfer density (fixability) to cotton cloth |  | 77.4% | 65.2% | 52.5% | 58.1% | 49.8% |
|  | Discharging stability |  | P | G | G | G | G |

|  |  |  | SP value | Example 1 | Example 2 | Example 3 | Example 4 | Example 5 |
|---|---|---|---|---|---|---|---|---|
| Chromatic ink | Coloring material | Liquid dispersion of cyan pigment surfactant |  | 5.0 | 5.0 | 5.0 | 5.0 | 5.0 |
|  | Organic solvent | Organic solvent G | 11.0 | 30.0 | 30.0 | 30.0 | 30.0 | 30.0 |
|  |  | Organic solvent H | 9.2 | 10.0 | 10.0 | 10.0 | 10.0 | 10.0 |
|  |  | Octane diol |  | 2.0 | 2.0 | 2.0 | 2.0 | 2.0 |
|  | Resin | Acrylic silicone-based resin C |  | 5.0 | 5.0 | 5.0 | 5.0 | 5.0 |
|  | Surfactant | Silicone-based surfactant |  | 2.0 | 2.0 | 2.0 | 2.0 | 2.0 |
|  | Defoaming agent | Defoaming agent |  | 4.7 | 4.7 | 4.7 | 4.7 | 4.7 |
|  | pH regulator | 2-amino-2-ethyl-1,3-propane diol |  | 0.5 | 0.5 | 0.5 | 0.5 | 0.5 |
|  | Antibacterial Agent | Antibacterial Agent |  | 1.0 | 1.0 | 1.0 | 1.0 | 1.0 |
|  | Corrosion inhibitor | Benzotriazoles |  | 1.0 | 1.0 | 1.0 | 1.0 | 1.0 |
|  | Water | Deionized water | 23.4 | 38.8 | 38.8 | 38.8 | 38.8 | 38.8 |
|  |  | Total |  |  |  | 100.0 | 100.0 | 100.0 |
|  |  | Mixing SP value $(cal/cm^3)^{0.5}$ of organic solvent and water in chromatic ink |  |  |  | 16.9 | 16.9 | 16.9 |
| White Ink | Hollow resin particle | Hollow resin particle |  | 8.5 | 8.5 | 8.5 | 8.5 | 8.5 |
|  | Organic solvent | Organic solvent A | 16.4 | 20.0 |  |  |  |  |
|  |  | Organic solvent B | 13.5 |  | 35.0 |  |  |  |
|  |  | Organic solvent C | 13.7 |  |  | 35.0 |  |  |
|  |  | Organic solvent D | 12.8 | 15.0 |  |  | 35.0 |  |
|  |  | Organic solvent E | 12.8 |  |  |  |  | 35.0 |
|  |  | Organic solvent F | 12.1 |  |  |  |  |  |
|  |  | Organic solvent G | 11.0 |  |  |  |  |  |
|  |  | Organic solvent H | 9.2 |  |  |  |  |  |
|  |  | Octane diol |  | 2.0 | 2.0 | 2.0 | 2.0 | 2.0 |
|  | Resin | Acrylic silicone-based resin A |  | 2.1 | 2.1 | 2.1 | 2.1 | 2.1 |
|  |  | Acrylic silicone-based resin B |  |  |  |  |  |  |
|  |  | Acrylic silicone-based resin C |  |  |  |  |  |  |
|  |  | Urethane resin |  |  |  |  |  |  |
|  | Wax | Polyethylene-based wax emulsion A |  |  |  |  |  |  |
|  |  | Carnauba wax: Polyethylene-based wax emulsion B |  |  |  |  |  |  |
|  | Surfactant | Silicone-based surfactant |  | 1.0 | 1.0 | 1.0 | 1.0 | 1.0 |
|  |  | Fluorochemical surfactant |  |  |  |  |  |  |
|  |  | Alkyl-based surfactant |  |  |  |  |  |  |
|  | Defoaming agent | Defoaming agent |  | 2.3 | 2.3 | 2.3 | 2.3 | 2.3 |
|  | Antibacterial Agent | Antibacterial Agent |  | 1.0 | 1.0 | 1.0 | 1.0 | 1.0 |

TABLE 1-continued

|  |  |  |  |  |  |  |  |  |
|---|---|---|---|---|---|---|---|---|
|  | Corrosion Inhibitor | Benzotriazoles |  | 1.0 | 1.0 | 1.0 | 1.0 | 1.0 |
|  | Water | Deionized water | 23.4 | 47.0 | 47.0 | 47.0 | 47.0 | 47.0 |
|  |  | Total |  | 100.0 | 100.0 | 100.0 | 100.0 | 100.0 |
|  |  | Mixing SP value (cal/cm³)^0.5 of mixture of Organic solvent in white ink + water |  | 19.7 | 19.2 | 19.3 | 18.9 | 18.9 |
|  |  | Dynamic surface tension (1,500 msec) (mN/m) of white ink |  | 20.6 | 20.6 | 20.6 | 20.6 | 20.6 |
|  |  | Mass ratio of resin in white ink to hollow resin particle |  | 0.25 | 0.25 | 0.25 | 0.25 | 0.25 |
|  |  | Drying temperature (degrees C.) |  | 70 | 70 | 70 | 70 | 70 |
|  |  | Drying time (second) |  | 60 | 60 | 60 | 60 | 60 |
| Evaluation Results |  | Luminosity (L*) of white ink solid portion at drying temperature for drying time |  | 63.2 | 62.1 | 62.3 | 61.1 | 61.4 |
|  |  | White ink layer thickness (μm) when dried at 70 degrees C. for 60 seconds |  | 2.6 | 2.5 | 2.5 | 2.5 | 2.5 |
|  |  | White ink layer thickness (μm) when dried at 90 degrees C. for 60 seconds |  | 2.5 | 2.3 | 2.4 | 2.4 | 2.3 |
|  |  | White ink layer thickness (μm) when dried at 70 degrees C. for 60 seconds |  | 63.2 | 62.1 | 62.3 | 61.1 | 61.4 |
|  |  | Luminosity (L*) at white ink solid portion when dried at 90 degrees C. for 60 seconds |  | 62.1 | 60.1 | 60.4 | 58.4 | 58.8 |
|  |  | Decrease ratio (percent) of white degree (L*) |  | 1.7% | 3.2% | 3.0% | 4.4% | 4.2% |
|  |  | Luminosity of Chromatic Ink Solid Portion |  | 39.0 | 37.8 | 38.1 | 37.1 | 37.5 |
|  |  | Transfer density (fixability) to cotton cloth |  | 67.3% | 71.6% | 70.9% | 74.5% | 73.6% |
|  |  | Discharging stability |  | G | G | G | G | G |

|  |  |  | SP value | Example 6 | Example 7 | Example 8 | Example 9 | Example 10 |
|---|---|---|---|---|---|---|---|---|
| Chromatic ink | Coloring material | Liquid dispersion of cyan pigment surfactant |  | 5.0 | 5.0 | 5.0 | 5.0 | 5.0 |
|  | Organic solvent | Organic solvent G | 11.0 | 30.0 | 30.0 | 30.0 | 30.0 | 30.0 |
|  |  | Organic solvent H | 9.2 | 10.0 | 10.0 | 10.0 | 10.0 | 10.0 |
|  |  | Octane diol |  | 2.0 | 2.0 | 2.0 | 2.0 | 2.0 |
|  | Resin | Acrylic silicone-based resin C |  | 5.0 | 5.0 | 5.0 | 5.0 | 5.0 |
|  | Surfactant | Silicone-based surfactant |  | 2.0 | 2.0 | 2.0 | 2.0 | 2.0 |
|  | Defoaming agent | Defoaming agent |  | 4.7 | 4.7 | 4.7 | 4.7 | 4.7 |
|  | pH regulator | 2-amino-2-ethyl-1,3-propane diol |  | 0.5 | 0.5 | 0.5 | 0.5 | 0.5 |
|  | Antibacterial Agent | Antibacterial Agent |  | 1.0 | 1.0 | 1.0 | 1.0 | 1.0 |
|  | Corrosion inhibitor | Benzotriazoles |  | 1.0 | 1.0 | 1.0 | 1.0 | 1.0 |
|  | Water | Deionized water | 23.4 | 38.8 | 38.8 | 38.8 | 38.8 | 38.8 |
|  |  | Total |  | 100.0 | 100.0 | 100.0 | 100.0 | 100.0 |
|  |  | Mixing SP value (cal/cm³)^0.5 of organic solvent and water in chromatic ink |  | 16.9 | 16.9 | 16.9 | 16.9 | 16.9 |
| White Ink | Hollow resin particle | Hollow resin particle |  | 8.5 | 8.5 | 8.5 | 8.5 | 8.5 |
|  | Organic solvent | Organic solvent A | 16.4 |  |  |  |  |  |
|  |  | Organic solvent B | 13.5 |  |  |  |  |  |
|  |  | Organic solvent C | 13.7 |  |  |  |  |  |
|  |  | Organic solvent D | 12.8 |  |  | 17.5 | 24.5 | 24.5 |

TABLE 1-continued

|  |  |  |  |  |  |  |  |
|---|---|---|---|---|---|---|---|
|  |  | Organic solvent E | 12.8 |  |  |  |  |
|  |  | Organic solvent F | 12.1 | 35.0 |  |  |  |
|  |  | Organic solvent G | 11.0 |  | 41.5 |  |  |
|  |  | Organic solvent H | 9.2 |  |  | 17.5 |  |
|  |  | Octane diol |  | 2.0 | 2.0 | 2.0 | 2.0 | 2.0 |
|  | Resin | Acrylic silicone-based resin A |  | 2.1 | 2.1 | 2.1 |  | 2.1 |
|  |  | Acrylic silicone-based resin B |  |  |  |  | 2.1 |  |
|  |  | Acrylic silicone-based resin C |  |  |  |  |  |  |
|  |  | Urethane resin |  |  |  |  |  |  |
|  | Wax | Polyethylene-based wax emulsion A |  |  |  |  |  |  |
|  |  | Carnauba wax: Polyethylene-based wax emulsion B |  |  |  |  |  |  |
|  | Surfactant | Silicone-based surfactant |  | 1.0 | 1.0 | 1.0 | 1.0 |  |
|  |  | Fluorochemical surfactant |  |  |  |  |  | 1.0 |
|  |  | Alkyl-based surfactant |  |  |  |  |  |  |
|  | Defoaming agent | Defoaming agent |  | 2.3 | 2.3 | 2.3 | 2.3 | 2.3 |
|  | Antibacterial Agent | Antibacterial Agent |  | 1.0 | 1.0 | 1.0 | 1.0 | 1.0 |
|  | Corrosion Inhibitor | Benzotriazoles |  | 1.0 | 1.0 | 1.0 | 1.0 | 1.0 |
|  | Water | Deionized water | 23.4 | 47.0 | 40.5 | 47.0 | 57.5 | 57.5 |
|  |  | Total |  | 100.0 | 100.0 | 100.0 | 100.0 | 100.0 |
|  | Mixing SP value $(cal/cm^3)^{0.5}$ of mixture of Organic solvent in white ink + water |  |  | 18.6 | 17.1 | 18.1 | 20.2 | 20.2 |
|  | Dynamic surface tension (1,500 msec) (mN/m) of white ink |  |  | 20.6 | 20.6 | 20.6 | 20.6 | 18.6 |
|  | Mass ratio of resin in white ink to hollow resin particle |  |  | 0.25 | 0.25 | 0.25 | 0.25 | 0.25 |
|  | Drying temperature (degrees C.) |  |  | 70 | 70 | 70 | 70 | 70 |
|  | Drying time (second) |  |  | 60 | 60 | 60 | 60 | 60 |
| Evaluation Results | Luminosity (L*) of white ink solid portion at drying temperature for drying time |  |  | 60.6 | 55.8 | 53.2 | 60.4 | 64.9 |
|  | White ink layer thickness (μm) when dried at 70 degrees C. for 60 seconds |  |  | 2.4 | 2.4 | 2.5 | 2.5 | 2.4 |
|  | White ink layer thickness (μm) when dried at 90 degrees C. for 60 seconds |  |  | 2.3 | 2.3 | 2.4 | 2.4 | 2.3 |
|  | White ink layer thickness (μm) when dried at 70 degrees C. for 60 seconds |  |  | 60.6 | 55.8 | 53.2 | 60.4 | 64.9 |
|  | Luminosity (L*) at white ink solid portion when dried at 90 degrees C. for 60 seconds |  |  | 57.4 | 50.4 | 49.6 | 60.1 | 64.5 |
|  | Decrease ratio (percent) of white degree (L*) |  |  | 5.3% | 9.7% | 6.8% | 0.5% | 0.6% |
|  | Luminosity of Chromatic Ink Solid Portion |  |  | 36.2 | 31.0 | 29.4 | 32.3 | 40.9 |
|  | Transfer density (fixability) to cotton cloth |  |  | 75.2% | 76.3% | 76.1% | 76.1% | 76.1% |
|  | Discharging stability |  |  | G | G | M | G | G |

|  |  |  | SP value | Example 11 | Example 12 | Example 13 | Example 14 | Example 15 |
|---|---|---|---|---|---|---|---|---|
| Chromatic ink | Coloring material | Liquid dispersion of cyan pigment surfactant |  | 5.0 | 5.0 | 5.0 | 5.0 | 5.0 |

TABLE 1-continued

| | | | | | | | | |
|---|---|---|---|---|---|---|---|---|
| | Organic solvent | Organic solvent G | 11.0 | 30.0 | 30.0 | 30.0 | 30.0 | 30.0 |
| | | Organic solvent H | 9.2 | 10.0 | 10.0 | 10.0 | 10.0 | 10.0 |
| | | Octane diol | | 2.0 | 2.0 | 2.0 | 2.0 | 2.0 |
| | Resin | Acrylic silicone-based resin C | | 5.0 | 5.0 | 5.0 | 5.0 | 5.0 |
| | Surfactant | Silicone-based surfactant | | 2.0 | 2.0 | 2.0 | 2.0 | 2.0 |
| | Defoaming agent | Defoaming agent | | 4.7 | 4.7 | 4.7 | 4.7 | 4.7 |
| | pH regulator | 2-amino-2-ethyl-1,3-propane diol | | 0.5 | 0.5 | 0.5 | 0.5 | 0.5 |
| | Antibacterial Agent | Antibacterial Agent | | 1.0 | 1.0 | 1.0 | 1.0 | 1.0 |
| | Corrosion inhibitor | Benzotriazoles | | 1.0 | 1.0 | 1.0 | 1.0 | 1.0 |
| | Water | Deionized water | 23.4 | 38.8 | 38.8 | 38.8 | 38.8 | 38.8 |
| | | Total | | 100.0 | 100.0 | 100.0 | 100.0 | 100.0 |
| | Mixing SP value $(cal/cm^3)^{0.5}$ of organic solvent and water in chromatic ink | | | 16.9 | 16.9 | 16.9 | 16.9 | 16.9 |
| White Ink | Hollow resin particle | Hollow resin particle | | 8.5 | 8.5 | 8.5 | 8.5 | 8.5 |
| | Organic solvent | Organic solvent A | 16.4 | | | | | |
| | | Organic solvent B | 13.5 | | | | | |
| | | Organic solvent C | 13.7 | | | | | |
| | | Organic solvent D | 12.8 | 35.0 | 24.5 | 24.5 | 24.5 | 24.5 |
| | | Organic solvent E | 12.8 | | | | | |
| | | Organic solvent F | 12.1 | | | | | |
| | | Organic solvent G | 11.0 | | | | | |
| | | Organic solvent H | 9.2 | | | | | |
| | | Octane diol | | 2.0 | 2.0 | 2.0 | 2.0 | 2.0 |
| | Resin | Acrylic silicone-based resin A | | 2.1 | 8.5 | 0.9 | 12.8 | 2.1 |
| | | Acrylic silicone-based resin B | | | | | | |
| | | Acrylic silicone-based resin C | | | | | | |
| | | Urethane resin | | | | | | |
| | Wax | Polyethylene-based wax emulsion A | | | | | | 1.0 |
| | | Carnauba wax: Polyethylene-based wax emulsion B | | | | | | |
| | Surfactant | Silicone-based surfactant | | | 1.0 | | | 1.0 |
| | | Fluorochemical surfactant | | | | 1.0 | 1.0 | |
| | | Alkyl-based surfactant | | 2.0 | | | | |
| | Defoaming agent | Defoaming agent | | 4.7 | 2.3 | 2.3 | 2.3 | 2.3 |
| | Antibacterial Agent | Antibacterial Agent | | 1.0 | 1.0 | 1.0 | 1.0 | 1.0 |
| | Corrosion Inhibitor | Benzotriazoles | | 1.0 | 1.0 | 1.0 | 1.0 | 1.0 |
| | Water | Deionized water | 23.4 | 43.7 | 51.2 | 58.8 | 46.9 | 56.5 |
| | | Total | | 100.0 | 100.0 | 100.0 | 100.0 | 100.0 |
| | Mixing SP value $(cal/cm^3)^{0.5}$ of mixture of Organic solvent in white ink + water | | | 18.7 | 20.0 | 20.3 | 19.7 | 20.2 |
| | Dynamic surface tension (1,500 insec) (mN/m) of white ink | | | 20.9 | 20.6 | 18.6 | 18.6 | 20.6 |
| | Mass ratio of resin in white ink to hollow resin particle | | | 0.25 | 1.00 | 0.10 | 1.50 | 0.25 |
| | Drying temperature (degrees C.) | | | 70 | 70 | 70 | 70 | 70 |
| | Drying time (second) | | | 60 | 60 | 60 | 60 | 60 |

TABLE 1-continued

| | | | | | | | | |
|---|---|---|---|---|---|---|---|---|
| Evaluation Results | | Luminosity (L*) of white ink solid portion at drying temperature for drying time | | 54.4 | 63.2 | 59.7 | 63.7 | 62 |
| | | White ink layer thickness (μm) when dried at 70 degrees C. for 60 seconds | | 2.5 | 2.5 | 2.4 | 2.4 | 2.4 |
| | | White ink layer thickness (μm) when dried at 90 degrees C. for 60 seconds | | 2.3 | 2.3 | 2.2 | 2.2 | 2.3 |
| | | White ink layer thickness (μm) when dried at 70 degrees C. for 60 seconds | | 54.4 | 63.2 | 59.7 | 63.7 | 62.0 |
| | | Luminosity (L*) at white ink solid portion when dried at 90 degrees C. for 60 seconds | | 51.8 | 62.6 | 59.6 | 62.6 | 61.8 |
| | | Decrease ratio (percent) of white degree (L*) | | 4.8% | 0.9% | 0.2% | 1.7% | 0.3% |
| | | Luminosity of Chromatic Ink Solid Portion | | 30.5 | 39.1 | 35.6 | 39.6 | 37.9 |
| | | Transfer density (fixability) to cotton cloth | | 65.1% | 80.4% | 65.4% | 82.7% | 81.7% |
| | | Discharging stability | | G | G | G | M | G |

| | | | SP value | Example 16 | Example 17 | Example 18 | Example 19 | Example 20 |
|---|---|---|---|---|---|---|---|---|
| Chromatic ink | Coloring material | Liquid dispersion of cyan pigment surfactant | | 5.0 | 5.0 | 5.0 | 5.0 | 5.0 |
| | Organic solvent | Organic solvent G | 11.0 | 30.0 | 30.0 | 30.0 | 30.0 | 30.0 |
| | | Organic solvent H | 9.2 | 10.0 | 10.0 | 10.0 | 10.0 | 10.0 |
| | | Octane diol | | 2.0 | 2.0 | 2.0 | 2.0 | 2.0 |
| | Resin | Acrylic silicone-based resin C | | 5.0 | 5.0 | 5.0 | 5.0 | 5.0 |
| | Surfactant | Silicone-based surfactant | | 2.0 | 2.0 | 2.0 | 2.0 | 2.0 |
| | Defoaming agent | Defoaming agent | | 4.7 | 4.7 | 4.7 | 4.7 | 4.7 |
| | pH regulator | 2-amino-2-ethyl-1,3-propane diol | | 0.5 | 0.5 | 0.5 | 0.5 | 0.5 |
| | Antibacterial Agent | Antibacterial Agent | | 1.0 | 1.0 | 1.0 | 1.0 | 1.0 |
| | Corrosion inhibitor | Benzotriazoles | | 1.0 | 1.0 | 1.0 | 1.0 | 1.0 |
| | Water | Deionized water | 23.4 | 38.8 | 38.8 | 38.8 | 38.8 | 8.8 |
| | | Total | | 100.0 | 100.0 | 100.0 | 100.0 | 100.0 |
| | Mixing SP value (cal/cm³)$^{0.5}$ of organic solvent and water in chromatic ink | | | 16.9 | 16.9 | 16.9 | 16.9 | 16.9 |
| White Ink | Hollow resin particle | Hollow resin particle | | 8.5 | 8.5 | 8.5 | 8.5 | 8.5 |
| | Organic solvent | Organic solvent A | 16.4 | | | | | |
| | | Organic solvent B | 13.5 | | | | | |
| | | Organic solvent C | 13.7 | | | | | |
| | | Organic solvent D | 12.8 | 24.5 | 24.5 | 35.0 | 35.0 | 35.0 |
| | | Organic solvent E | 12.8 | | | | | |
| | | Organic solvent F | 12.1 | | | | | |
| | | Organic solvent G | 11.0 | | | | | |
| | | Organic solvent H | 9.2 | | | | | |
| | | Octane diol | | 2.0 | 2.0 | 2.0 | 2.0 | 2.0 |
| | Resin | Acrylic silicone-based resin A | | 2.1 | 2.1 | 2.1 | 2.1 | 2.1 |
| | | Acrylic silicone-based resin B | | | | | | |
| | | Acrylic silicone- | | | | | | |

TABLE 1-continued

| | | | SP value | | | | | |
|---|---|---|---|---|---|---|---|---|
| | Wax | based resin C Urethane resin Polyethylene-based wax emulsion A | | | | | | |
| | | Carnauba wax: Polyethylene-based wax emulsion B | | 1.0 | 1.0 | | | |
| | Surfactant | Silicone-based surfactant Fluorochemical surfactant Alkyl-based surfactant | | 1.0 | 1.0 | 1.0 | 1.0 | 1.0 |
| | Defoaming agent | Defoaming agent | | 2.3 | 2.3 | 2.3 | 2.3 | 2.3 |
| | Antibacterial Agent | Antibacterial Agent | | 1.0 | 1.0 | 1.0 | 1.0 | 1.0 |
| | Corrosion Inhibitor | Benzotriazoles | | 1.0 | 1.0 | 1.0 | 1.0 | 1.0 |
| | Water | Deionized water | 23.4 | 56.5 | 56.5 | 47.0 | 47.0 | 47.0 |
| | | Total | | 100.0 | 100.0 | 100.0 | 100.0 | 100.0 |
| | Mixing SP value (cal/cm$^3$)$^{0.5}$ of mixture of Organic solvent in white ink + water | | | 20.2 | 20.2 | 18.9 | 18.9 | 18.9 |
| | Dynamic surface tension (1,500 msec) (mN/m) of white ink | | | 20.6 | 20.6 | 20.6 | 20.6 | 20.6 |
| | Mass ratio of resin in white ink to hollow resin particle | | | 0.25 | 0.25 | 0.25 | 0.25 | 0.25 |
| | Drying temperature (degrees C.) | | | 70 | 70 | 90 | 50 | 30 |
| | Drying time (second) | | | 60 | 60 | 60 | 5 | 60 |
| Evaluation Results | Luminosity (L*) of white ink solid portion at drying temperature for drying time | | | 61.8 | 61.3 | 60.7 | 63.4 | 55.1 |
| | White ink layer thickness (μm) when dried at 70 degrees C. for 60 seconds | | | 2.4 | 2.4 | 2.4 | 2.5 | 2.5 |
| | White ink layer thickness (μm) when dried at 90 degrees C. for 60 seconds | | | 2.3 | 2.3 | 2.3 | 2.4 | 2.4 |
| | White ink layer thickness (μm) when dried at 70 degrees C. for 60 seconds | | | 61.8 | 61.3 | 61.1 | 61.1 | 61.1 |
| | Luminosity (L*) at white ink solid portion when dried at 90 degrees C. for 60 seconds | | | 61.5 | 60.9 | 58.4 | 58.4 | 58.4 |
| | Decrease ratio (percent) of white degree (L*) | | | 0.5% | 0.7% | 4.4% | 4.4% | 4.4% |
| | Luminosity of Chromatic Ink Solid Portion | | | 37.7 | 37.2 | 36.6 | 39.3 | 31.2 |
| | Transfer density (fixability) to cotton cloth | | | 80.5% | 78.1% | 76.8% | 70.2% | 59.4% |
| | Discharging stability | | | G | M | G | G | G |

| | | | SP value | Example 21 | Example 22 |
|---|---|---|---|---|---|
| Chromatic ink | Coloring material | Liquid dispersion of cyan pigment surfactant | | 5.0 | 5.0 |
| | Organic solvent | Organic solvent G | 11.0 | 30.0 | 30.0 |
| | | Organic solvent H | 9.2 | 10.0 | 10.0 |
| | | Octane diol | | 2.0 | 2.0 |
| | Resin | Acrylic silicone-based resin C | | 5.0 | 5.0 |
| | Surfactant | Silicone-based surfactant | | 2.0 | 2.0 |
| | Defoaming agent | Defoaming agent | | 4.7 | 4.7 |
| | pH regulator | 2-amino-2-ethyl-1,3-propane diol | | 0.5 | 0.5 |

TABLE 1-continued

|  |  |  |  |  |  |
|---|---|---|---|---|---|
|  | Antibacterial Agent | Antibacterial Agent |  | 1.0 | 1.0 |
|  | Corrosion inhibitor | Benzotriazoles |  | 1.0 | 1.0 |
|  | Water | Deionized water | 23.4 | 38.8 | 38.8 |
|  | Total |  |  | 100.0 | 100.0 |
|  | Mixing SP value (cal/cm$^3$)$^{0.5}$ of organic solvent and water in chromatic ink |  |  | 16.9 | 16.9 |
| White Ink | Hollow resin particle | Hollow resin particle |  | 8.5 | 8.5 |
|  | Organic solvent | Organic solvent A | 16.4 |  |  |
|  |  | Organic solvent B | 13.5 |  |  |
|  |  | Organic solvent C | 13.7 |  |  |
|  |  | Organic solvent D | 12.8 | 35.0 | 35.0 |
|  |  | Organic solvent E | 12.8 |  |  |
|  |  | Organic solvent F | 12.1 |  |  |
|  |  | Organic solvent G | 11.0 |  |  |
|  |  | Organic solvent H | 9.2 |  |  |
|  |  | Octane diol |  | 2.0 | 2.0 |
|  | Resin | Acrylic silicone-based resin A |  | 2.1 | 2.1 |
|  |  | Acrylic silicone-based resin B |  |  |  |
|  |  | Acrylic silicone-based resin C |  |  |  |
|  |  | Urethane resin |  |  |  |
|  | Wax | Polyethylene-based wax emulsion A |  |  |  |
|  |  | Carnauba wax: Polyethylene-based wax emulsion B |  |  |  |
|  | Surfactant | Silicone-based surfactant |  | 1.0 | 1.0 |
|  |  | Fluorochemical surfactant |  |  |  |
|  |  | Alkyl-based surfactant |  |  |  |
|  | Defoaming agent | Defoaming agent |  | 2.3 | 2.3 |
|  | Antibacterial Agent | Antibacterial Agent |  | 1.0 | 1.0 |
|  | Corrosion Inhibitor | Benzotriazoles |  | 1.0 | 1.0 |
|  | Water | Deionized water | 23.4 | 47.0 | 47.0 |
|  | Total |  |  | 100.0 | 100.0 |
|  | Mixing SP value (cal/cm$^3$)$^{0.5}$ of mixture of Organic solvent in white ink + water |  |  | 18.9 | 18.9 |
|  | Dynamic surface tension (1,500 msec) (mN/m) of white ink |  |  | 20.6 | 20.6 |
|  | Mass ratio of resin in white ink to hollow resin particle |  |  | 0.25 | 0.25 |
|  | Drying temperature (degrees C.) |  |  | 70 | 110 |
|  | Drying time (second) |  |  | 90 | 60 |
| Evaluation Results | Luminosity (L*) of white ink solid portion at drying temperature for drying time |  |  | 57.1 | 48.2 |
|  | White ink layer thickness (μm) when dried at 70 degrees C. for 60 seconds |  |  | 2.5 | 2.5 |
|  | White ink layer thickness (μm) when dried at 90 degrees C. for 60 seconds |  |  | 2.4 | 2.4 |
|  | White ink layer thickness (μm) when dried at 70 degrees C. for 60 seconds |  |  | 61.1 | 61.1 |
|  | Luminosity (L*) at white ink solid portion when |  |  | 58.4 | 58.4 |

TABLE 1-continued

|  |  |  |
|---|---|---|
| dried at 90 degrees C. for 60 seconds |  |  |
| Decrease ratio (percent) of white degree (L*) | 4.4% | 4.4% |
| Luminosity of Chromatic Ink Solid Portion | 33.1 | 25.0 |
| Transfer density (fixability) to cotton cloth | 76.2% | 78.1% |
| Discharging stability | G | G |

According to the present disclosure, a white ink is provided which maintains luminosity (L*) even when a hollow resin particle is used and also has a luminosity (L*) of 50 or greater when dried.

Having now fully described embodiments of the present invention, it will be apparent to one of ordinary skill in the art that many changes and modifications can be made thereto without departing from the spirit and scope of embodiments of the invention as set forth herein.

What is claimed is:

1. A white ink comprising
   a hollow resin particle;
   one or more first organic solvents;
   an acrylic silicone-based resin;
   a surfactant; and
   water,
   wherein luminosity (L*) of each of a first dried film having a thickness of 2.2-2.8 μm prepared by drying the white ink at 70 degrees C. and a second dried film having a thickness of 2.2-2.8 μm prepared by drying the white ink at 90 degrees C. is 50 or greater and
   wherein a decrease ratio of the luminosity (L*) of the second dried film to the first dried film is 10 percent or less.

2. The white ink according to claim 1, wherein mixing SP of a solution of the first organic solvent and the water of the white ink is 17.0-20.3 $(cal/cm^3)^{0.5}$.

3. The white ink according to claim 1, wherein glass transition temperature of the acrylic silicone-based resin is 30 degrees C. or lower.

4. The white ink according to claim 1, wherein dynamic surface tension of the white ink is 18-21 mN/m at a bubble life time of 1,500 msec (as measured by maximum bubble pressure technique).

5. The white ink according to claim 1, wherein each hydrogen bond term of said one or more first organic solvents is 3-6.8 $(cal/cm^3)^{0.5}$, and each boiling point of said one or more first organic solvent is 150-300 degrees C.

6. The white ink according to claim 1, wherein said one of more first organic solvent includes at least one of 1,2-propane diol, 1,3-propane diol, 1,2-butane diol, 1,3-butane diol, isoprene glycol, and an oxetane compound.

7. The white ink according to claim 1, wherein a mass ratio of the acrylic silicone-based resin to the hollow resin particle is 0.25 to 1.

8. The white ink according to claim 1, further comprising wax, which includes a polyethylene-based wax emulsion or carnauba wax and has a melting point of the wax is 80-140 degrees C.

9. An ink set comprising:
   a white ink including a hollow resin particle, one or more first organic solvents, an acrylic silicone-based resin, a surfactant, and water; and
   an ink including a coloring material, a second organic solvent, and water,
   wherein luminosity (L*) of each of a first dried film having a thickness of 2.2-2.8 μm prepared by drying the white ink at 70 degrees C. and a second dried film having a thickness of 2.2-2.8 μm prepared by drying the white ink at 90 degrees C. is 50 or greater and wherein a decrease ratio of the luminosity (L*) of the second dried film to the first dried film is 10 percent or less.

10. An inkjet recording method comprising:
    applying thermal energy or mechanical energy to a white ink and an ink of an ink set to discharge the white ink and the ink onto a recording medium; and
    drying the white ink and the ink on the recording medium wherein the white ink includes a hollow resin particle, one or more first organic solvents, an acrylic silicone-based resin, a surfactant, and water; and the ink includes a coloring material, a second organic solvent, and water,
    wherein luminosity (L*) of each of a first dried film having a thickness of 2.2-2.8 μm prepared by drying the white ink at 70 degrees C. and a second dried film having a thickness of 2.2-2.8 μm prepared by drying the white ink at 90 degrees C. is 50 or greater and
    wherein a decrease ratio of the luminosity (L*) of the second dried film to the first dried film is 10 percent or less.

* * * * *